(12) United States Patent
Wu et al.

(10) Patent No.: US 7,764,572 B2
(45) Date of Patent: Jul. 27, 2010

(54) METHODS AND SYSTEMS FOR ACOUSTIC WAVEFORM PROCESSING

(75) Inventors: Peter T. Wu, Sugar Land, TX (US); Jahir Pabon, Wellesley, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/007,402

(22) Filed: Dec. 8, 2004

(65) Prior Publication Data

US 2006/0120217 A1    Jun. 8, 2006

(51) Int. Cl.
*G01V 1/40*    (2006.01)

(52) U.S. Cl. .............................. 367/31; 367/35; 367/73; 181/102

(58) Field of Classification Search .................. 367/31, 367/32, 25, 38, 35, 73; 702/11; 181/102, 181/105
See application file for complete search history.

(56) References Cited

U.S. PATENT DOCUMENTS

| | | | |
|---|---|---|---|
| 4,594,691 A | 6/1986 | Kimball et al. | |
| 4,698,792 A | 10/1987 | Kurkjian et al. | |
| 4,698,793 A | 10/1987 | Wu | |
| 4,703,460 A | 10/1987 | Kurkjian et al. | |
| 4,932,003 A | 6/1990 | Winbow et al. | |
| 5,027,331 A | 6/1991 | Winbow et al. | |
| 5,077,697 A * | 12/1991 | Chang | 367/31 |
| 5,278,805 A | 1/1994 | Kimball | |
| 5,381,092 A | 1/1995 | Freedman | |
| 5,587,966 A | 12/1996 | Kimball | |
| 5,594,706 A | 1/1997 | Shenoy et al. | |
| 5,661,696 A * | 8/1997 | Kimball et al. | 367/31 |
| 5,687,138 A | 11/1997 | Kimball et al. | |
| 5,740,124 A | 4/1998 | Chunduru et al. | |
| 5,808,963 A * | 9/1998 | Esmersoy | 367/31 |
| 5,999,484 A | 12/1999 | Kimball et al. | |
| 6,084,826 A | 7/2000 | Leggett, III | |
| 6,176,323 B1 | 1/2001 | Weirich et al. | |
| 6,427,124 B1 | 7/2002 | Dubinsky et al. | |
| 6,449,560 B1 | 9/2002 | Kimball | |

(Continued)

FOREIGN PATENT DOCUMENTS

WO    03/076967    9/2003

OTHER PUBLICATIONS

Ledvij, Marko. "Curve Fitting Made Easy." The Industrial Physicist, Apr./May 2003.*

(Continued)

*Primary Examiner*—Scott A Hughes
(74) *Attorney, Agent, or Firm*—Matthias Abrell; Jaime Castano; Dale Gaudier

(57) ABSTRACT

A technique for processing acoustic waveforms includes: (a) transforming at least a portion of the acoustic waveforms to produce frequency-domain signals; (b) obtaining a model dispersion curve based on a borehole-formation model having a set of borehole-formation parameters; (c) adjusting phases of the frequency-domain signals according to the model dispersion curve to produce back-propagated signals; (d) computing coherence of the back-propagated signals; (e) repeating steps (b)-(d) by varying values of the set of borehole-formation parameters until the coherence reaches a selected criterion; and (f) outputting at least a portion of the set of borehole-formation parameters.

18 Claims, 33 Drawing Sheets
(29 of 33 Drawing Sheet(s) Filed in Color)

U.S. PATENT DOCUMENTS

| | | | |
|---|---|---|---|
| 6,581,010 B2 | 6/2003 | Dubinsky et al. | |
| 6,614,716 B2* | 9/2003 | Plona et al. | 367/31 |
| 6,631,327 B2* | 10/2003 | Hsu et al. | 702/6 |
| 6,654,688 B1* | 11/2003 | Brie et al. | 702/2 |
| 6,691,036 B2 | 2/2004 | Blanch et al. | |
| 6,868,341 B2* | 3/2005 | Valero | 702/11 |
| 6,907,349 B2* | 6/2005 | Mandal | 367/49 |
| 2002/0116128 A1* | 8/2002 | Sinha et al. | 702/6 |
| 2004/0001389 A1 | 1/2004 | Tang | |
| 2004/0006428 A1 | 1/2004 | Hsu et al. | |
| 2004/0122595 A1 | 6/2004 | Valero | |
| 2004/0145503 A1 | 7/2004 | Blanch et al. | |
| 2004/0158404 A1 | 8/2004 | Gaston et al. | |
| 2004/0199331 A1 | 10/2004 | Mandal | |
| 2005/0000688 A1* | 1/2005 | Hsu et al. | 166/254.2 |
| 2005/0261835 A1* | 11/2005 | Wang | 702/6 |

OTHER PUBLICATIONS

Metcalfe, Travis. "Seismic interference using genetic algorithms." Astrophysics and Space Science, 284, 41-151, 2003.*

Kimball C.V., "Shear slowness measurement by dispersive processing of the borehole flexural mode". Geophysics, vol. 53, No. 2, 1998, pp. 337-344.

\* cited by examiner

METHODS AND SYSTEMS FOR ACOUSTIC WAVEFORM PROCESSING

BACKGROUND OF INVENTION

1. Field of the Invention

The invention relates generally to acoustic well logging. More particularly, the invention relates to methods and systems for acoustic log data processing.

2. Background Art

The oil and gas industry uses various tools to probe the formations penetrated by a borehole in order to locate hydrocarbon reservoirs and to determine the types and quantities of the hydrocarbons. Among these tools, acoustic tools have been found to provide valuable information regarding formation properties. In acoustic logging, a tool is typically lowered into a borehole, either after the well is drilled or while the well is being drilled, and acoustic energy is transmitted from a source into the borehole and the formation. The acoustic waves that travel in the formation are then detected with an array of receivers.

Modern acoustic tools generally have multipole sources. The multipole sources may include one or more monopoles, dipoles, and quadrupoles to excite different modes. Monopole mode excitation is traditionally used to generate compressional and shear head waves. From the monopole measurements, formation compressional and shear slowness can be obtained by processing the head wave components. However, in slow formations, which are defined as having shear slowness higher than the borehole fluid slowness, the shear head waves are not measurable. Therefore, in slow formations, shear wave logging has to rely on borehole modes, such as dipole modes for wireline tools or quadrupole modes for logging-while-drilling (LWD) tools, to indirectly provide the formation shear slowness.

Unlike monopole head waves, the dipole or quadrupole borehole modes are dispersive. The characteristics of the dipole or quadrupole modes depend on formation shear slowness (DTs) as well as many other borehole-formation parameters, such as formation compressional slowness (DTc), formation density ($\rho b$), mud slowness (DTm), mud density ($\rho m$), and hole diameter (HD). Thus, in order to derive formation shear slowness (DTs) from the dipole or quadrupole modes, knowledge of these other borehole-formation parameters is needed.

One known method for processing the dipole or quadrupole dispersive wave components to obtain the shear slowness is the dispersive slowness-time-coherence (DSTC) method disclosed in U.S. Pat. No. 5,278,805 issued to Kimball (assigned to the present assignee and incorporated herein by reference in its entirety). See also, Kimball, Geophysics, Vol. 63, No. 2, March-April 1998. The DSTC method assumes all borehole-formation parameters, except DTs, are known. These borehole-formation parameters may be obtained from other logging operations or from the known dimensions of the borehole and the tool.

The accuracy of the DSTC processing depends on the accuracy of the other assumed known borehole-formation parameters: DTc, $\rho b$, DTm, $\rho m$, and HD. In other words, any inaccuracy in these other borehole-formation parameters may have an impact on the accuracy of the derived formation shear slowness (DTs). Sensitivity analysis indicates that mud slowness (DTm) has great impact on the accuracy of formation shear slowness (DTs) derived from DSTC processing. The influence of DTm is particularly significant in fast rocks such that without an accurate mud slowness, it is very difficult, if not impossible, to obtain an accurate formation shear slowness (DTs) with DSTC processing. This is true even if high quality measured waveforms, with the best possible signal-to-noise ratio, are available. However, accurate DTm values are not always available. Therefore, a need remains for more robust techniques for shear slowness estimation. In particular, techniques that can produce DTs without prior knowledge of other borehole-formation parameters are highly desirable.

SUMMARY OF INVENTION

One aspect of the invention relates to methods for processing acoustic waveforms. A method in accordance with one embodiment of the invention includes: (a) transforming at least a portion of the acoustic waveforms to produce frequency-domain signals; (b) obtaining a model dispersion curve based on a borehole-formation model having a set of borehole-formation parameters; (c) adjusting phases of the frequency-domain signals according to the model dispersion curve to produce back-propagated signals; (d) computing coherence of the back-propagated signals; (e) repeating steps (b)-(d) by varying values of the set of borehole-formation parameters until the coherence reaches a selected criterion; and (f) outputting at least a portion of the set of borehole-formation parameters.

One aspect of the invention relates to methods for processing acoustic waveforms. A method in accordance with one embodiment of the invention includes: (a) transforming at least a portion of the acoustic waveforms to produce frequency-domain signals; (b) obtaining a model dispersion curve based on a borehole-formation model having a set of borehole-formation parameters; (c) adjusting phases of the frequency-domain signals according to the model dispersion curve to produce back-propagated signals; (d) computing coherence of the back-propagated signals; (e) repeating steps (b)-(d) by varying values of the set of borehole-formation parameters until a cost function that relates to the coherence reaches a selected criterion; and (f) outputting at least a portion of the set of borehole-formation parameters.

One aspect of the invention relates to systems for processing acoustic waveforms. A system in accordance with one embodiment of the invention includes a processor and a memory, wherein the memory stores a program having instructions for: (a) transforming at least a portion of the acoustic waveforms to produce frequency-domain signals; (b) obtaining a model dispersion curve based on a borehole-formation model having a set of borehole-formation parameters; (c) adjusting phases of the frequency-domain signals according to the model dispersion curve to produce back-propagated signals; (d) computing coherence of the back-propagated signals; (e) repeating steps (b)-(d) by varying values of the set of borehole-formation parameters until the coherence reaches a selected criterion; and (f) outputting at least a portion of the set of borehole-formation parameters.

One aspect of the invention relates to systems for processing acoustic waveforms. A system in accordance with one embodiment of the invention includes a processor and a memory, wherein the memory stores a program having instructions for: (a) transforming at least a portion of the acoustic waveforms to produce frequency-domain signals; (b) obtaining a model dispersion curve based on a borehole-formation model having a set of borehole-formation parameters; (c) adjusting phases of the frequency-domain signals according to the model dispersion curve to produce back-propagated signals; (d) computing coherence of the back-propagated signals; (e) repeating steps (b)-(d) by varying values of the set of borehole-formation parameters until a cost function that relates to the coherence reaches a selected criterion; and (f) outputting at least a portion of the set of borehole-formation parameters.

One aspect of the invention relates to methods for determining anisotropy of a formation. A method in accordance with one embodiment of the invention includes determining a first elastic shear constant of the formation from acoustic waveforms corresponding to monopole Stoneley mode; determining a second and a third elastic shear constants of the formation from acoustic waveforms corresponding to dipole mode or quadrupole mode; and comparing the first, the second, and the third elastic shear constants of the formation.

Other aspects and advantages of the invention will be apparent from the following description and the appended claims.

BRIEF DESCRIPTION OF DRAWINGS

The patent or application file contains at least one drawing executed in color. Copies of this patent or patent application publication with color drawings will be provided by the Office upon request and payment of the necessary fee.

DETAILED DESCRIPTION

Figure 1:
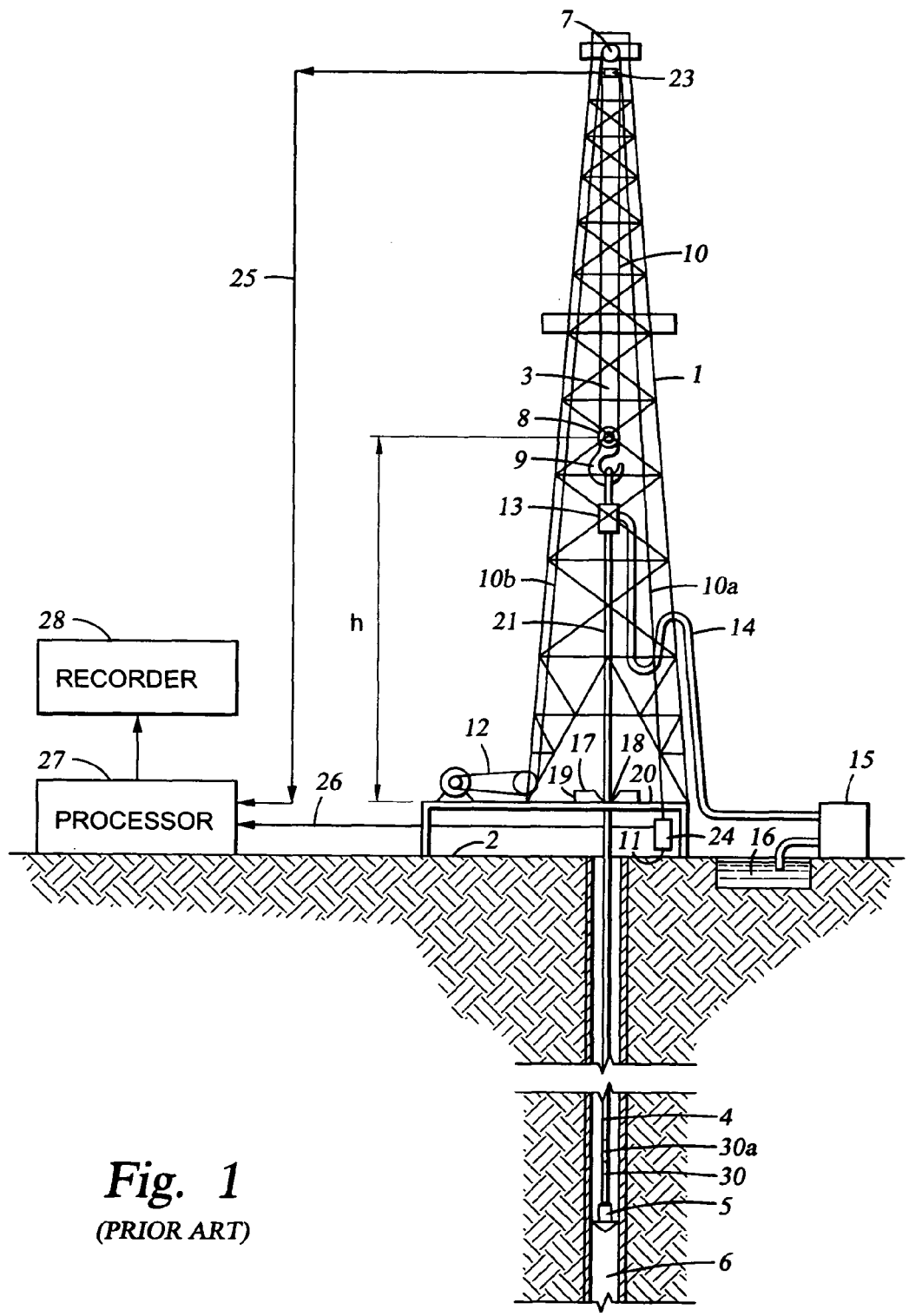
FIG. 1 is a prior art logging-while-drilling system having an acoustic tool disposed in a borehole.

Embodiments of the invention relate to techniques for determining borehole-formation parameters from acoustic array waveforms. Methods in accordance with embodiments of the invention may be used to obtain formation shear slowness (DTs) without prior knowledge of other borehole-formation parameters. In addition to providing formation shear slowness (DTs), methods in accordance with embodiments of the invention may also be used to provide other borehole-formation parameters, such as mud slowness (DTm) and borehole diameter (HD). Methods of the invention may be used with acoustic waveforms acquired with various acoustic tools.

Typical acoustic tools are designed to measure formation slownesses, such as compressional slowness (DTc) and shear slowness (DTs). However, they are not optimized for measuring other borehole-formation parameters, such as mud slowness (DTm) or borehole diameter (HD). Nevertheless, such other borehole-formation parameters may also affect the accuracy of formation slownesses determination. Such influence may be strong under certain conditions and weak under other conditions. For example, mud slowness (DTm) and borehole diameter (HD) have more significant influence on the accuracy of the formation slowness determination based on borehole modes in fast formations, compared to slow formations. If certain borehole-formation parameters have little or no influence on the formation slowness measurements, then the formation slowness measurements are generally insensitive to variations in these parameters. As a result, parametric inversion would not be able to produce accurate values for these "insensitive" parameters.

Embodiments of the invention may find applications in deriving shear slowness from borehole quadrupole modes and borehole dipole modes, without relying on prior knowledge or assumption of borehole-formation parameters. In addition, embodiments of the invention can also be used to estimate DTs from monopole Stoneley waves. Therefore, embodiments of the invention can extend the capability of existing monopole tools.

In addition, techniques of the invention may also be used to provide an indicator of formation anisotropy because they are able to derive formation shear slowness from monopole, dipole, and quadrupole dispersive components. Formation shear slowness inverted from monopole Stoneley mode is related to the $C_{66}$ shear elastic constant, which characterizes the shear rigidity in the x-y plane when the tool is aligned with the z-axis. See Norris and Sinha, "*Weak Elastic Anisotropy and the Tube Wave*," Geophysics, vol. 58, pp. 1091-98 (1993). On the other hand, the formation shear slowness inverted from the dipole and quadrupole modes are related to $C_{44}$ or $C_{55}$ shear elastic constants, which characterize the shear rigidity in the x-z and y-z plane, respectively. Thus, embodiments of the invention provide formation anisotropy indications using acoustic tools with general multipole capabilities. For isotropic formations, $C_{44}=C_{55}=C_{66}$, while for anisotropic formations, at least one of the $C_{44}$, $C_{55}$, and $C_{66}$ shear elastic constants is different from the others. The formation anisotropy information can help the reservoir model builder or borehole mechanic model builder arrive at a more accurate model. Similarly, formation anisotropy information is also useful in interpreting formation logs acquired with other tools.

Embodiments of the invention may be used to derive monopole, dipole, quadrupole, and higher-order modes using waveform data obtained with conventional acoustic tools such as wireline tools, logging-while-drilling (LWD) tools, measurement-while-drilling (MWD) tools, and logging-while-tripping (LWT) tools.

FIG. 1 shows a general illustration of a drilling rig and an LWD tool in a borehole. The rotary drilling rig shown comprises a mast 1 rising above ground 2 and is fitted with a lifting gear 3. A drill string 4 formed of drill pipes screwed one to another is suspended from the lifting gear 3. The drill string 4 has at its lower end a drill bit 5 for the drilling well 6. Lifting gear 3 consists of crown block 7, the axis of which is fixed to the top of mast 1, vertically traveling block 8, to which is attached hook 9, cable 10 passing round blocks 7 and 8 and forming, from crown block 7, on one hand dead line 10a anchored to fixed point 11 and on the other active line 10b which winds round the drum of winch 12.

Drill string 4 is suspended from hook 9 by means of swivel 13, which is linked by hose 14 to mud pump 15. Pump 15 permits the injection of drilling mud into well 6, via the hollow pipes of drill string 4. The drilling mud may be drawn from mud pit 16, which may be fed with surplus mud from well 6. The drill string 4 may be elevated by turning lifting gear 3 with winch 12. Drill pipe raising and lowering operations require drill string 4 to be temporarily unhooked from lifting gear 3; the former is then supported by blocking it with wedges 17 in conical recess 18 in rotating table 19 that is mounted on platform 20, through which the drill string passes. The lower portion of the drill string 4 may include one or more tools, as shown at 30, for investigating downhole drilling conditions or for investigating the properties of the geological formations. Tool 30 shown is an acoustic logging tool having at least one transmitter and a plurality of receivers spaced therefrom.

Variations in height h of traveling block 8 during drill string raising operations are measured by means of sensor 23 which may be an angle of rotation sensor coupled to the faster pulley of crown block 7. Weight applied to hook 9 of traveling block 8 may also be measured by means of strain gauge 24 inserted into dead line 10a of cable 10 to measure its tension. Sensors 23 and 24 are connected by lines 25 and 26 to processing unit 27 which processes the measurement signals and which incorporates a clock. Recorder 28 is connected to processing unit 27, which is preferably a computer. In addition, the downhole acoustic tool 30 may include a processing unit 30a. The downhole processing unit 30a and/or the surface processing unit 27, which may include a memory, may be used to perform the data analysis and determination of formation properties in accordance with embodiments of the invention.

Acoustic data acquired with a logging tool are waveforms received by the array of receivers. These waveforms may be displayed on a chart, or log, as waveform amplitude versus time. Acoustic waveforms include a large amount of data, which would need to be analyzed with an appropriate method to derive information related to formation properties.

The slowness-time-coherence (STC) method is among the most commonly used methods in acoustic data processing. See U.S. Pat. No. 4,594,691 issued to Kimball et al. and Kimball et al., Geophysics, Vol. 49 (1984), pp. 264-28. The STC method processes the monopole acoustic signals for coherent arrivals, including the formation compressional, shear, and borehole Stoneley waves. This method systematically computes the coherence (C) of the signals in time windows, which start at a given time (T) and have a given window moveout slowness (S) across the array. The time windows, which are determined by the start time (T) and the window move-out slowness (S), used in an STC process are based on the particular tool configuration and formation-borehole properties (e.g., borehole dimensions, mud types, and formation properties). The STC processing produces a 2D plane C(S,T), called slowness-time plane (STP). All coherent arrivals in the waveforms will show up in the STP as prominent coherent peaks. Each coherent peak has three attributes, the peak coherent value (COPK) and the peak location in the slowness-time plane (DTPK and TTPK), that can be used to determine formation properties. These attributes of the coherent peaks represent condensed information extracted from the recorded waveforms.

As noted above, the STC method is most useful with non-dispersive waveforms (e.g., monopole compressional and shear head waves). For processing the dispersive waveforms, the dispersive slowness-time-coherence (DSTC) method is preferred. The DSTC method can process the quadrupole signals for formation shear slowness from acoustic tools. This is a model-based method, in which a set of model dispersion curves are used in back-propagation processing to determine which model dispersion curve maximizes the coherence of the back-propagated signals. Back propagation is a process for correcting dispersion effects in the acquired waveforms. The dispersion effects manifest themselves as phase shifts in the frequency domain. These phase shifts can be corrected in the frequency domain with the model dispersion curves. For detailed discussion of the DSTC method or its variant, see U.S. Pat. No. 5,278,805 issued to Kimball.

Figure 2A:
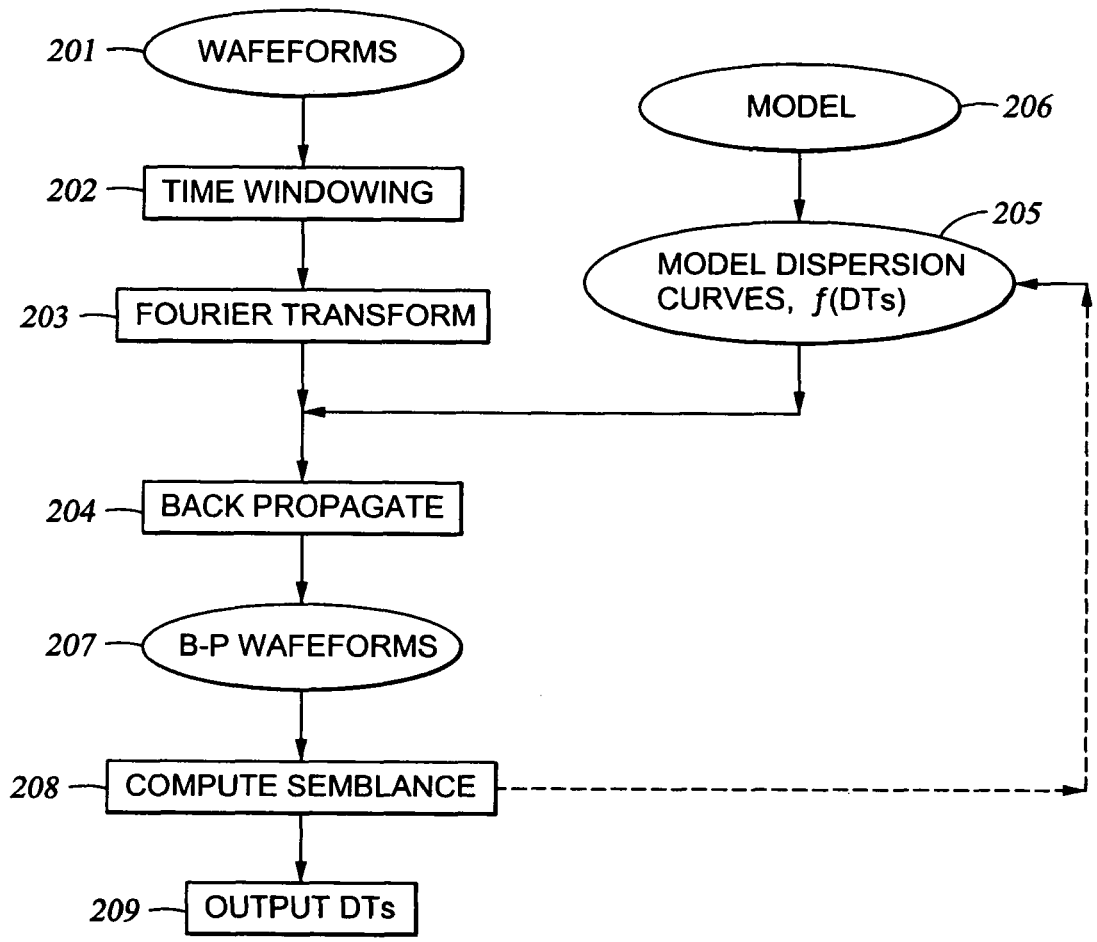
FIG. 2A is a flow chart of the conventional DSTC method.

FIG. 2A shows a schematic of a DSTC method. Briefly, the DSTC method optionally scans the waveforms (201) obtained in an acoustic logging operation with a time window having a given length and a variable starting time (T) (step 202). The time window moves systematically across the entire waveform such that one of the window positions may yield the best coverage of the time support region of the target waves (signals). The windowed waveforms are then Fourier transformed (or fast Fourier transformed, FFT, or other transformations capable of converting time domain signals into frequency domain signals) into the frequency domain (step 203). One of ordinary skill in the art would appreciate that methods used in converting time-domain signals into frequency-domain signals are not germane to the invention and, therefore, embodiments of the invention are not limited by any particular method used in such conversion. Therefore, the term "transforming" or "transformation" is generally used in this description to refer to any method that can accomplish such conversion, including FT, FFT, DFT (discrete FT), and the like. The dispersive effect of the waves is then removed by back propagation (step 204), which corrects phases of the frequency domain signals based on the pre-computed, model dispersion curves (205). The model dispersion curves are generated based on a borehole-formation model (206). Back-propagation produces back-propagated waveforms (207). Finally, coherence (or semblance) is computed on the back-propagated waveforms (207). The coherence computation may be performed on the back-propagated waveforms (207) in the frequency domain, without converting the waveforms back to the time domain by reverse Fourier transformation (or reverse FFT). The DSTC method systematically tries all dispersion curves (corresponding to different DTs values, or shear slowness values (S)) within a given slowness range that encompasses all possible formation shear slowness. In the end, a two-dimensional plane of coherence (C) as functions of slowness (S) and time (T) is obtained. The slowness (S) at the peak of this 2D coherence plane is then outputted as the shear slowness (DTs) (step 209).

As shown in FIG. 2A, the DSTC method inverts for formation shear slowness only and assumes all other parameters are known. That is, the borehole-formation model (206 in FIG. 2A) and the model dispersion curves (205 in FIG. 2A) depend on a single variable, the formation shear slowness (DTs). Thus, accuracy of the DSTC processing depends on the accuracy of the assumed values of other borehole-formation parameters: DTc, ρb, DTm, ρm, HD, etc. Sensitivity analysis reveals that mud slowness (DTm) has significant impact on the accuracy of shear slowness (DTs) determination by the DSTC method. However, accurate estimates of DTm may not always be available. Therefore, methods that do not rely on assumed values of other parameters are desirable.

Figure 2B:
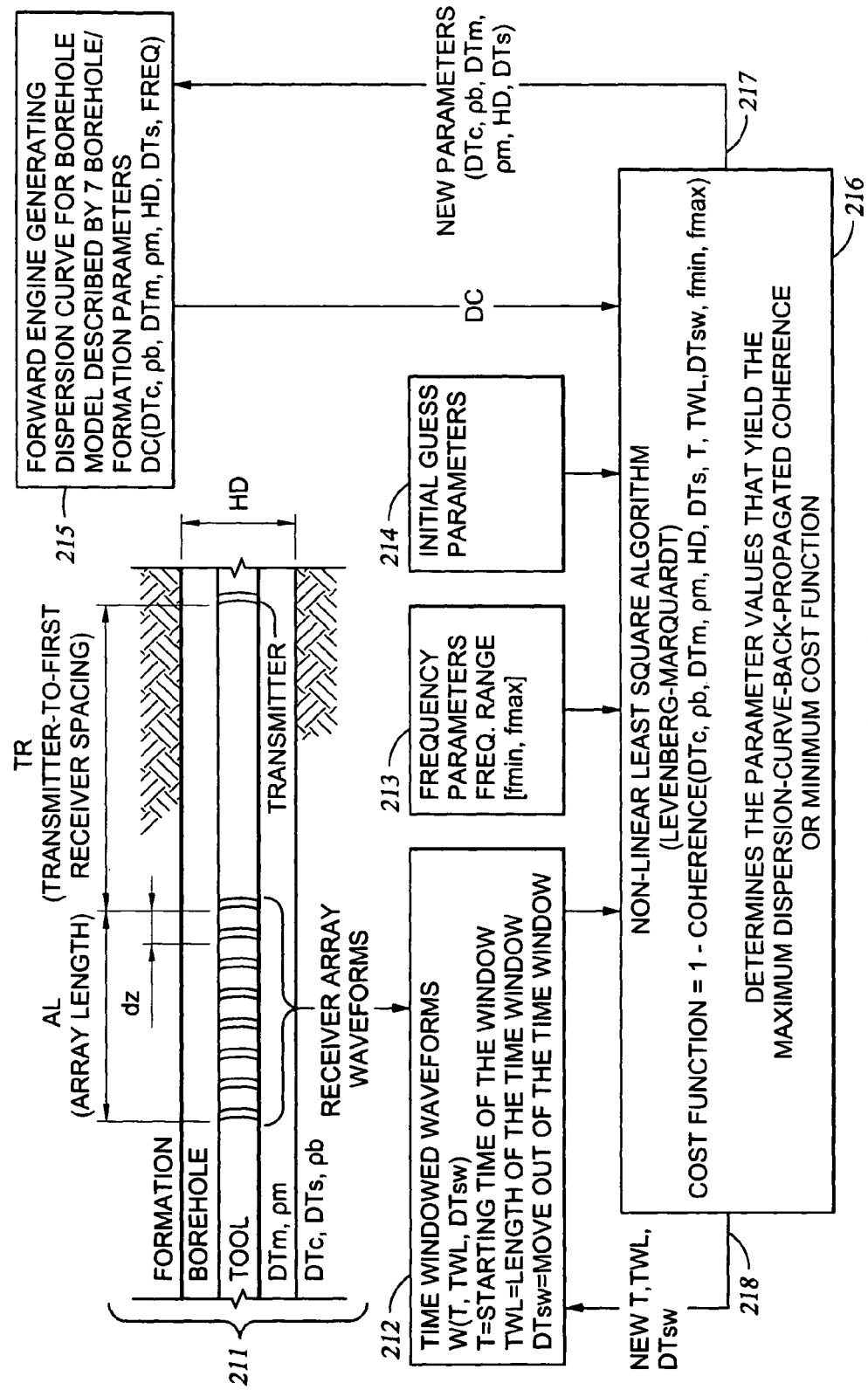
FIG. 2B is a schematic of a method using a parametric inversion to derive formation parameters from acoustic waveforms in accordance with one embodiment of the invention.

Embodiments of the invention entail parametric inversion and do not rely on any prior knowledge (or assumption) of other borehole-formation parameters. FIG. 2B shows a simplified schematic of a method in accordance with one embodiment of the invention. The diagram shows how acoustic waveforms can be inverted to determine subsurface properties with parametric inversion.

As shown in FIG. 2B, acoustic array waveforms (211) are measured with an acoustic tool in a borehole (See FIG. 1). The acoustic array waveforms depend on various tool-borehole-formation parameters. In accordance with embodiments of the invention, the array waveforms may be optionally processed with windowing, using a time window that starts at time T and has a length of TWL (212). The time window may have a move-out across the array with a slowness of DTsw. Windowing is a common technique used in acoustic waveform processing, detail description of which, for example, can be found in U.S. Pat. No. 5,278,805 issued to Kimball. One of ordinary skill in the art would appreciate that time windowing helps to simplify the waveforms for subsequent analysis, but it is not a necessary step. Thus, some embodiments of the invention may not include a windowing step.

The windowed waveforms (or the original waveforms) may then be processed to determine the borehole-formation parameters by various methods known in the art, such as parametric inversion (216). In forward modeling, a borehole-formation model is constructed to generate model dispersion curves (DC) of the borehole modes (e.g., Stoneley, dipole, and/or quadrupole mode) (215). Note that the borehole-formation model (hence, the model dispersion curves), in accordance with embodiments of the invention, depend not only on the formation shear slowness (DTs) but also on other borehole-formation parameters (e.g., formation compressional slowness (DTc), formation density (ρb), mud slowness (DTm), mud density (ρm), and borehole diameter (HD)). The model dispersion curves may be generated based on all parameters in the borehole-formation model. Alternatively, the model dispersion curves may be generated based on a selected number of borehole-formation parameters, while the remaining borehole-formation parameters are fixed at selected values. These selected values may be guesstimates or obtained from other measurements. In the example of FIG. 2B, seven borehole-formation parameters are used to generate dispersion curves: DTc, ρb, DTm, ρm, HD, DTs, and frequency. One of ordinary skill in the art would appreciate that more or fewer parameters may also be used without departing from the scope of the invention.

The model dispersion curves together with the original or windowed waveforms are used to determine the best estimates of the borehole-formation parameters in an iterative process 216 that is described in more detail with reference to FIG. 2C.

Figure 2C:
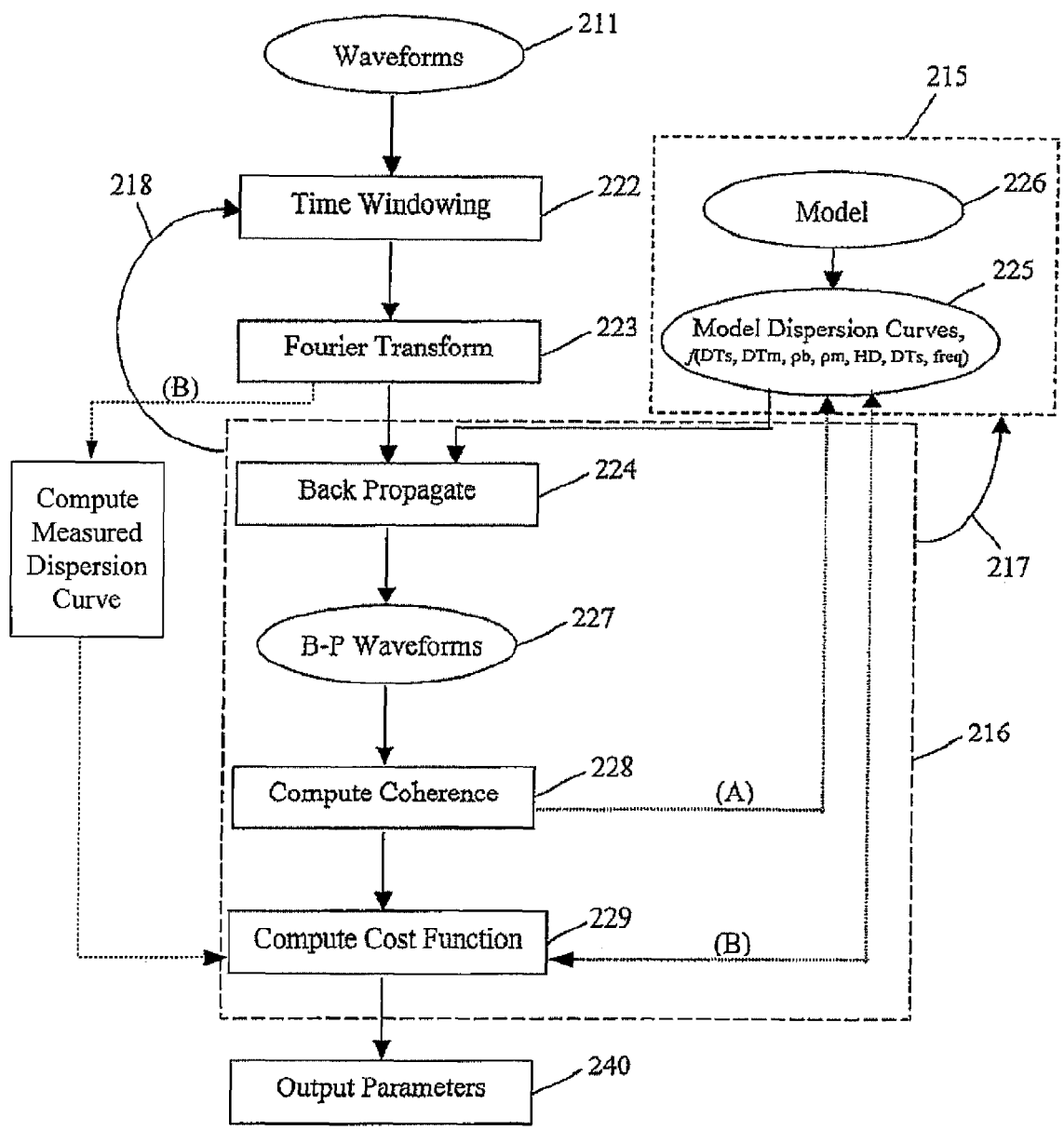
FIG. 2C is a flow chart of a method of acoustic waveform processing in accordance with one embodiment of the invention.
Figure 3A:
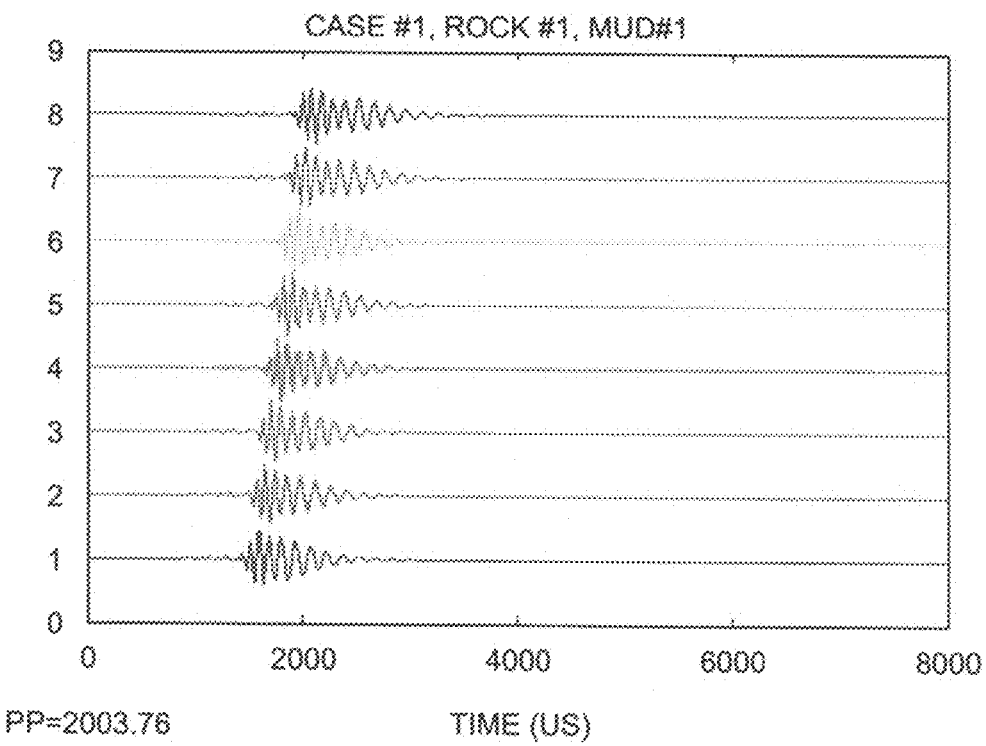
FIG. 3 shows waveforms for a fast formation in various muds to be processed by a method in accordance with one embodiment of the invention.
Figure 3B:
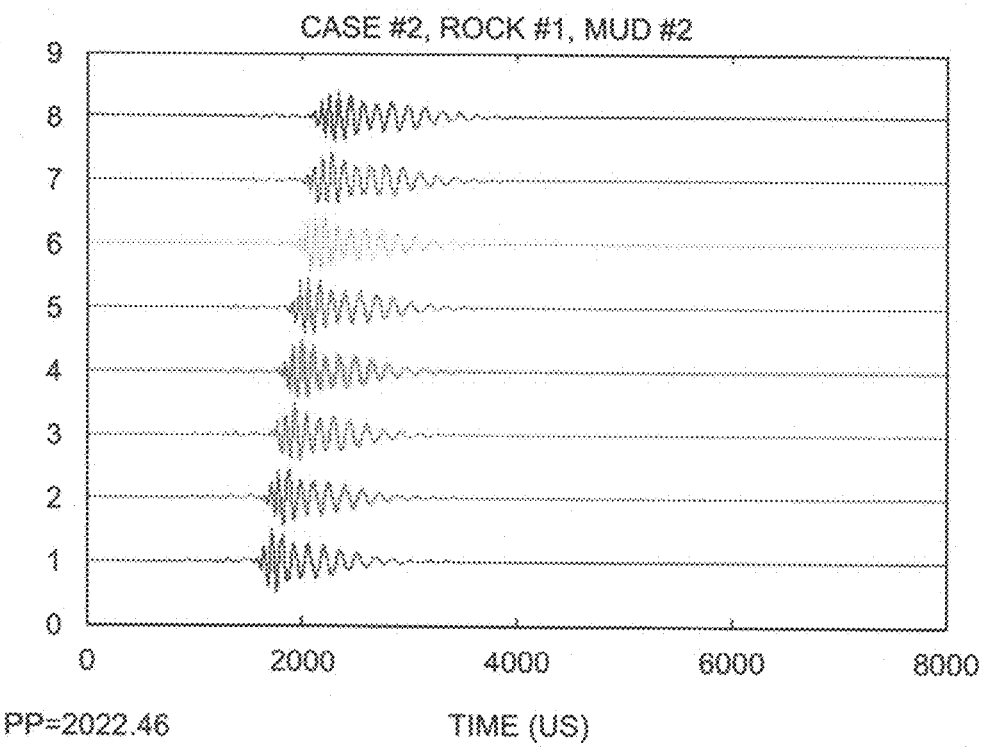
Figure 3C:
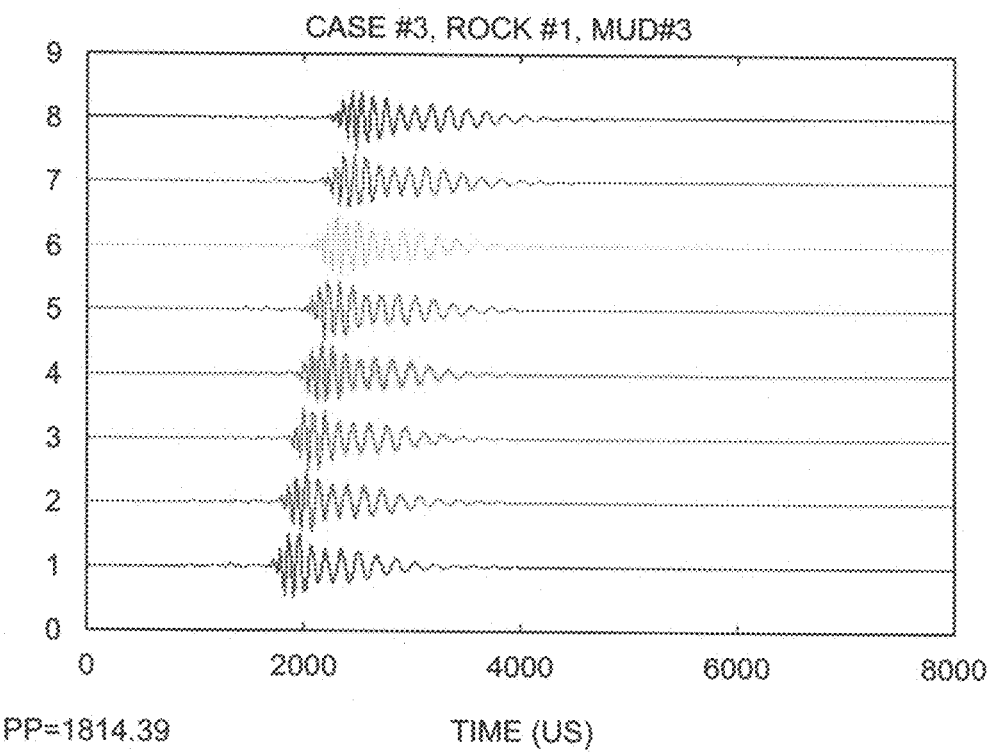
Figure 3D:
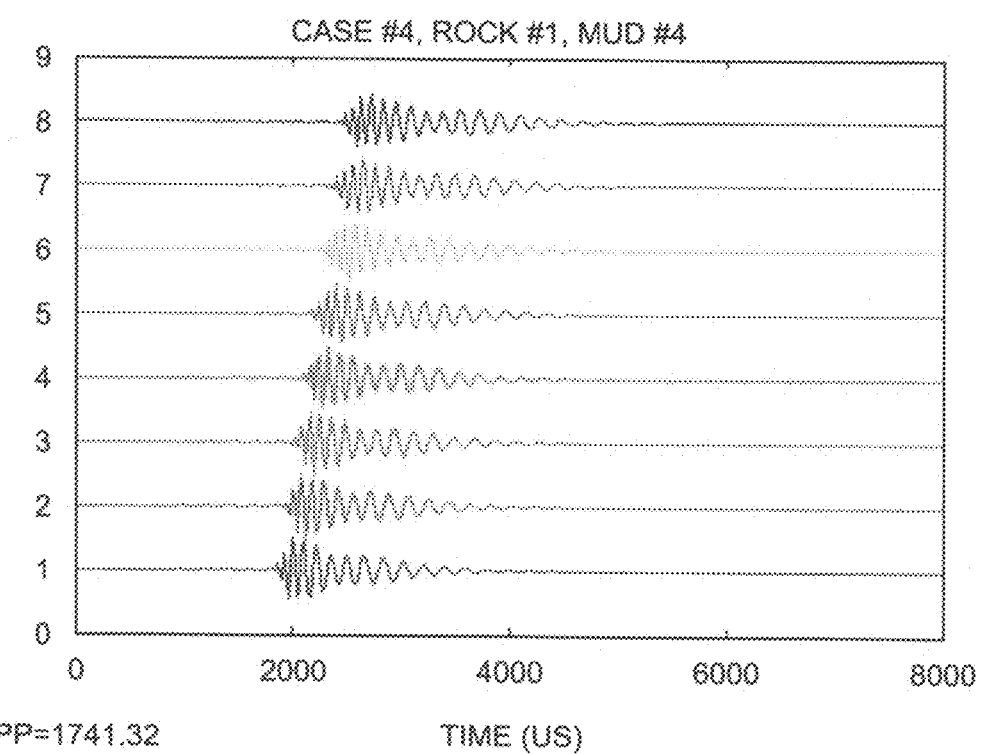
Figure 4A:
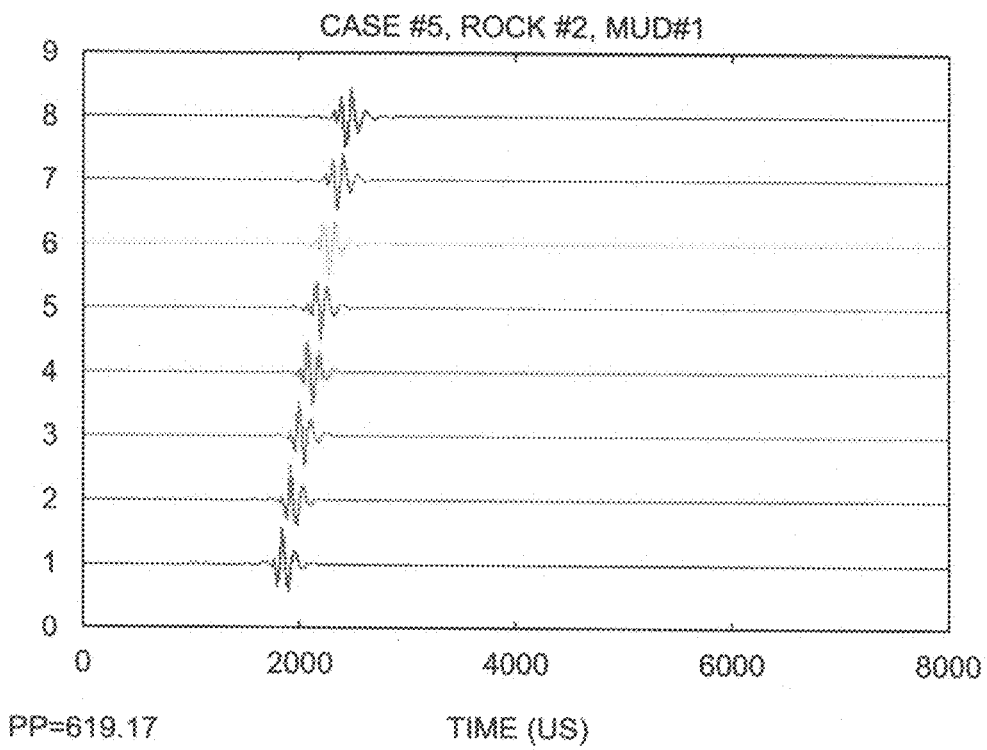
FIG. 4 shows waveforms for a formation in various muds to be processed by a method in accordance with one embodiment of the invention.
Figure 4B:
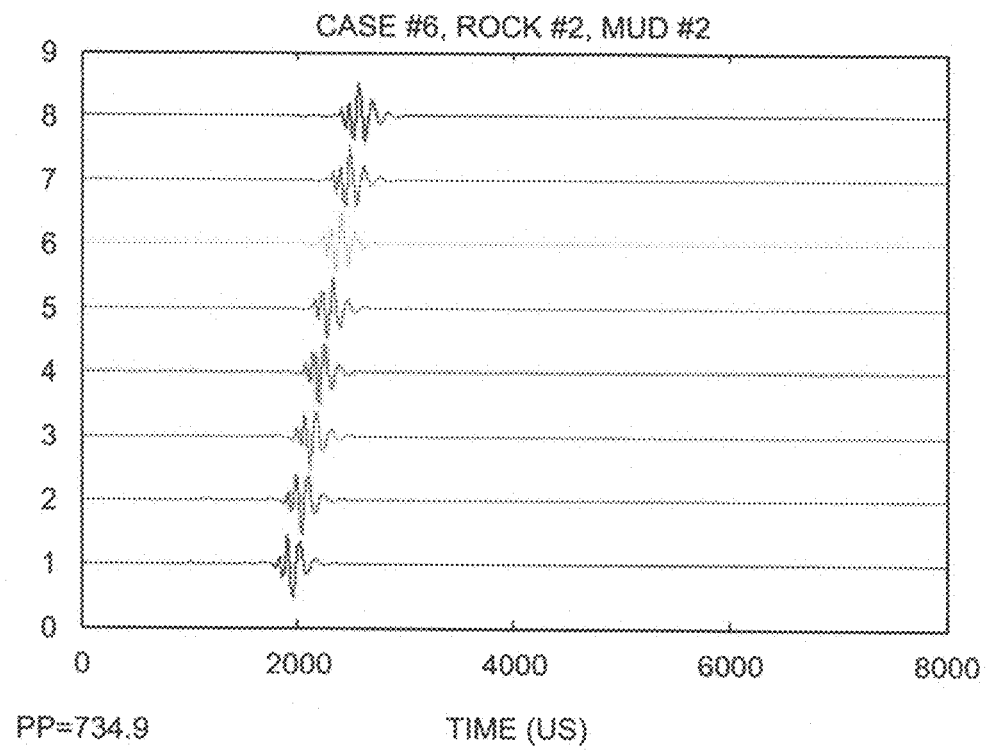
Figure 4C:
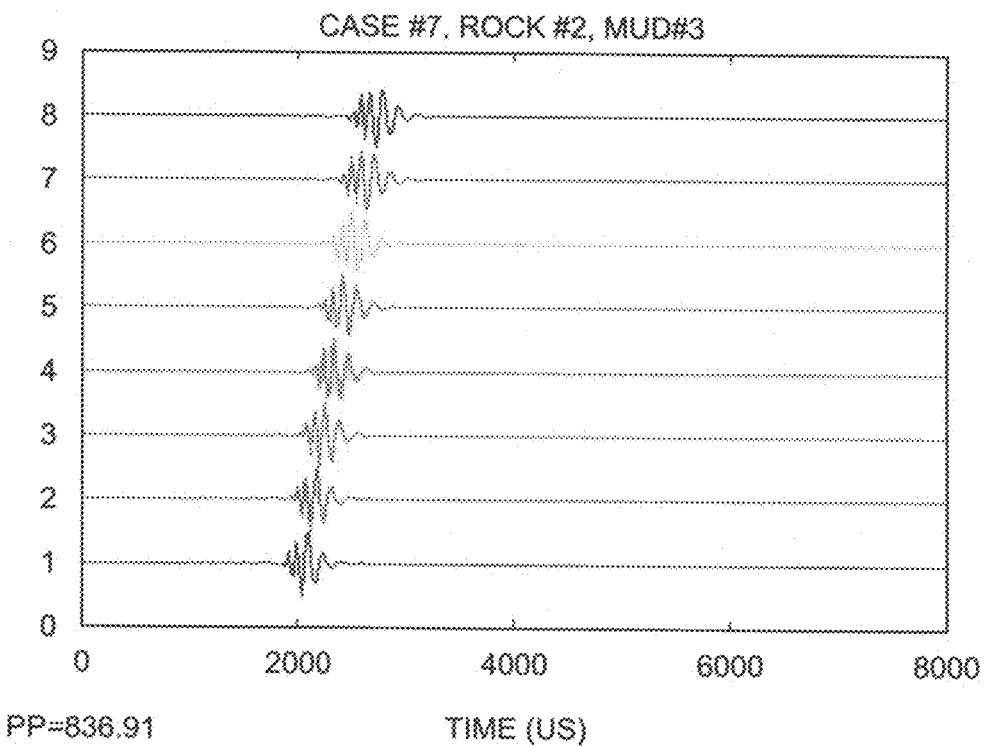
Figure 4D:
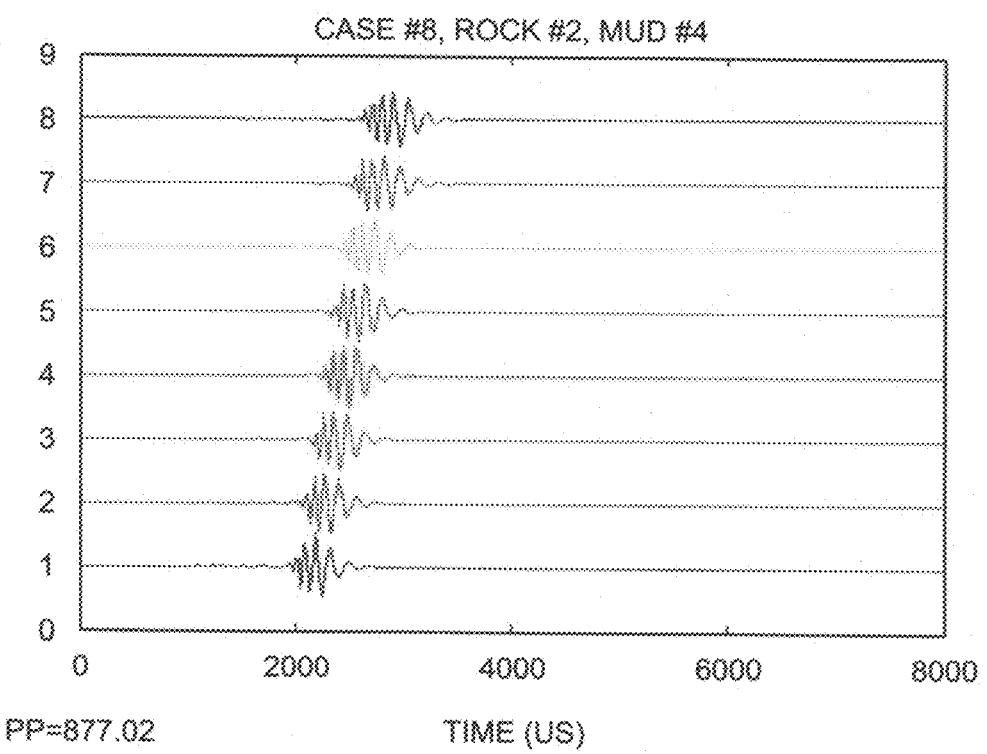
Figure 5A:
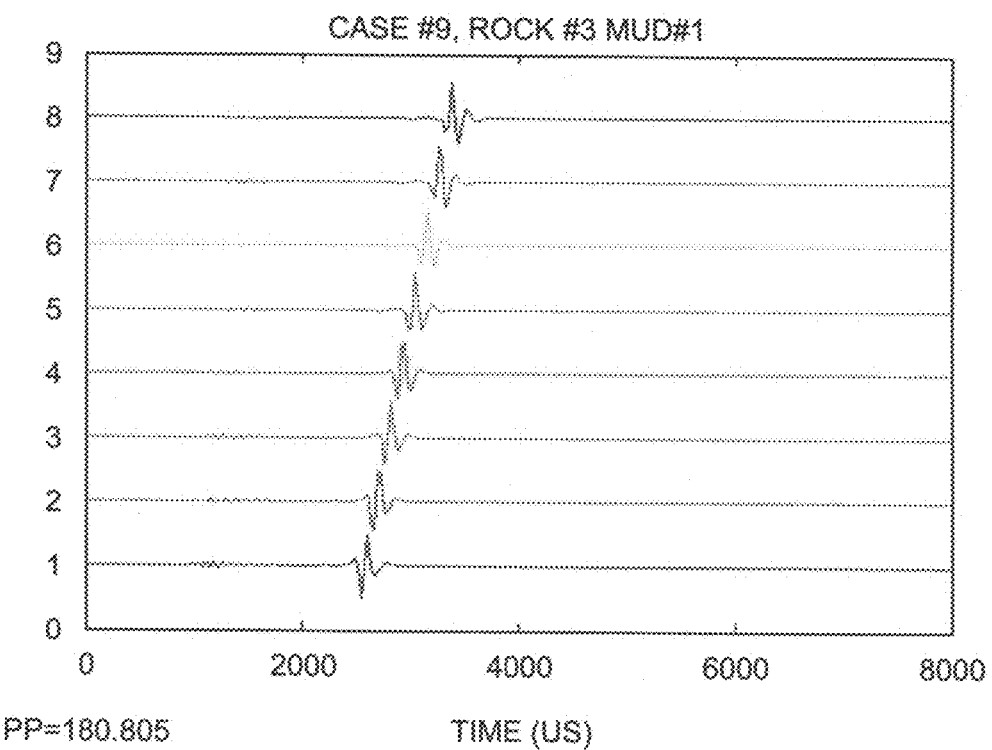
FIG. 5 shows waveforms for a slow formation in various muds to be processed by a method in accordance with one embodiment of the invention.
Figure 5B:
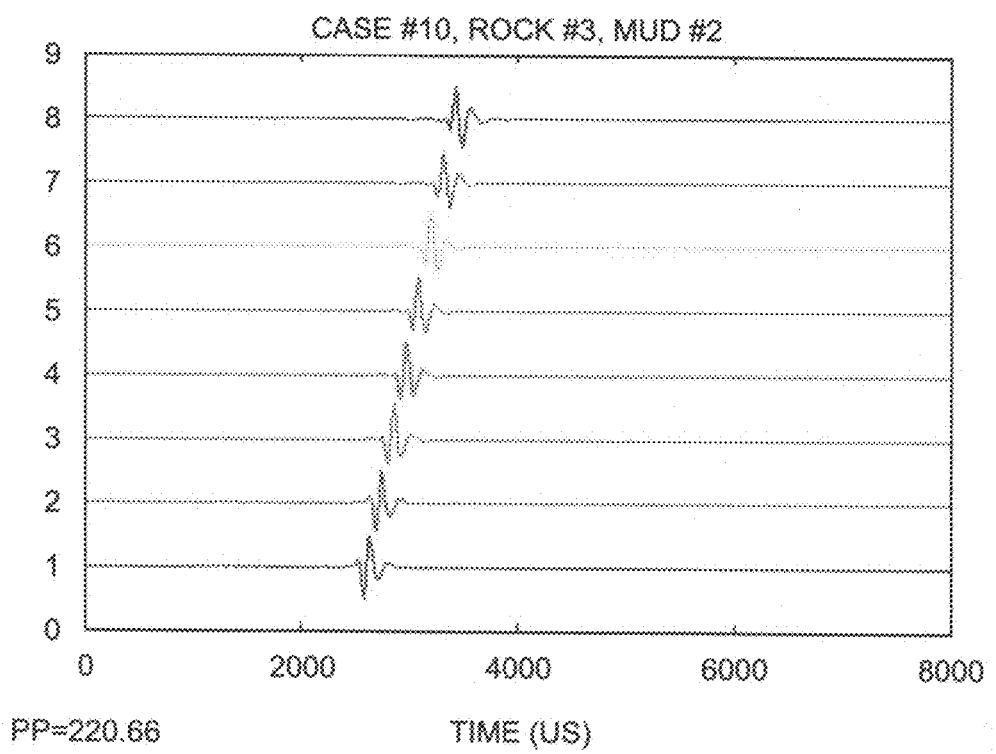
Figure 5C:
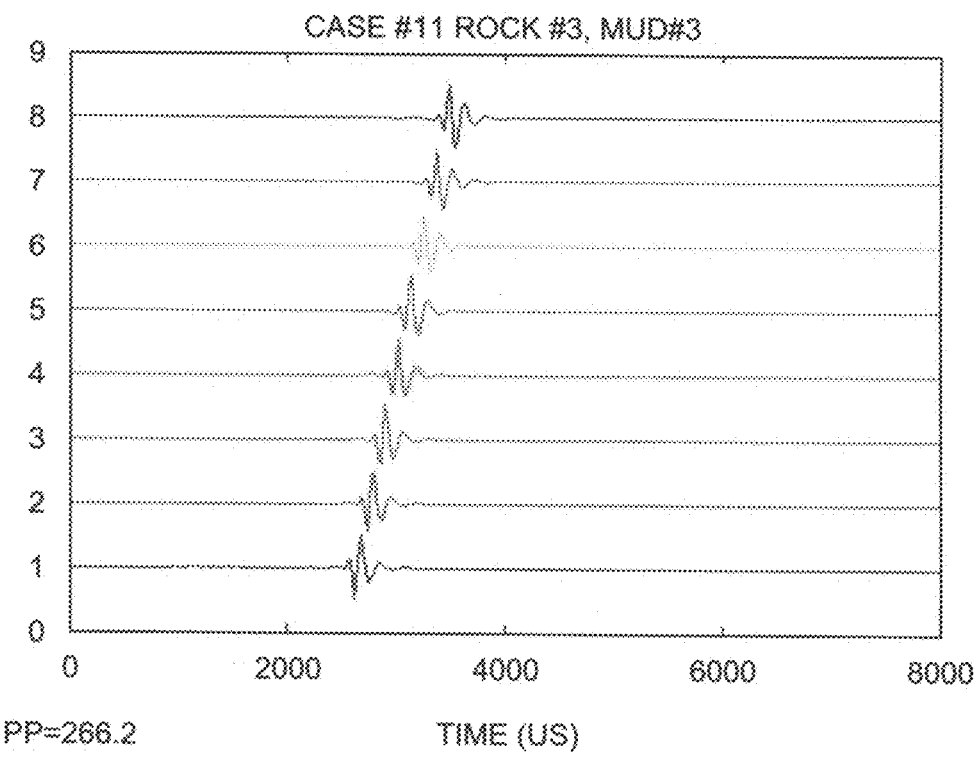
Figure 5D:
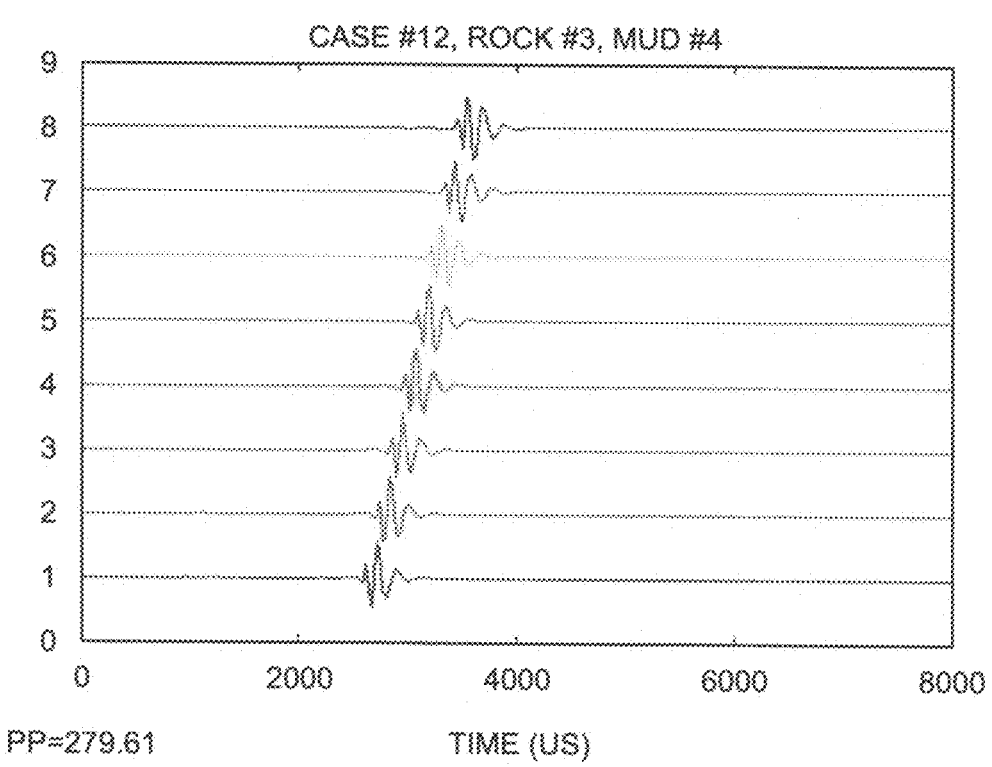
Figure 6A:
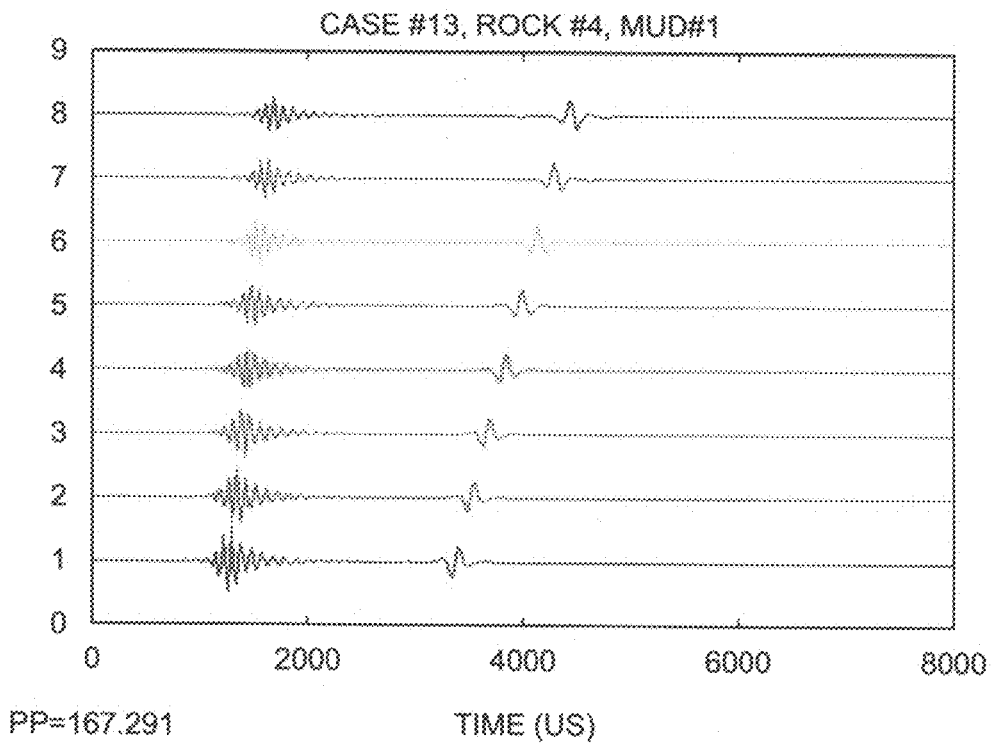
FIG. 6 shows waveforms for a slow formation in various muds to be processed by a method n accordance with one embodiment of the invention.
Figure 6B:
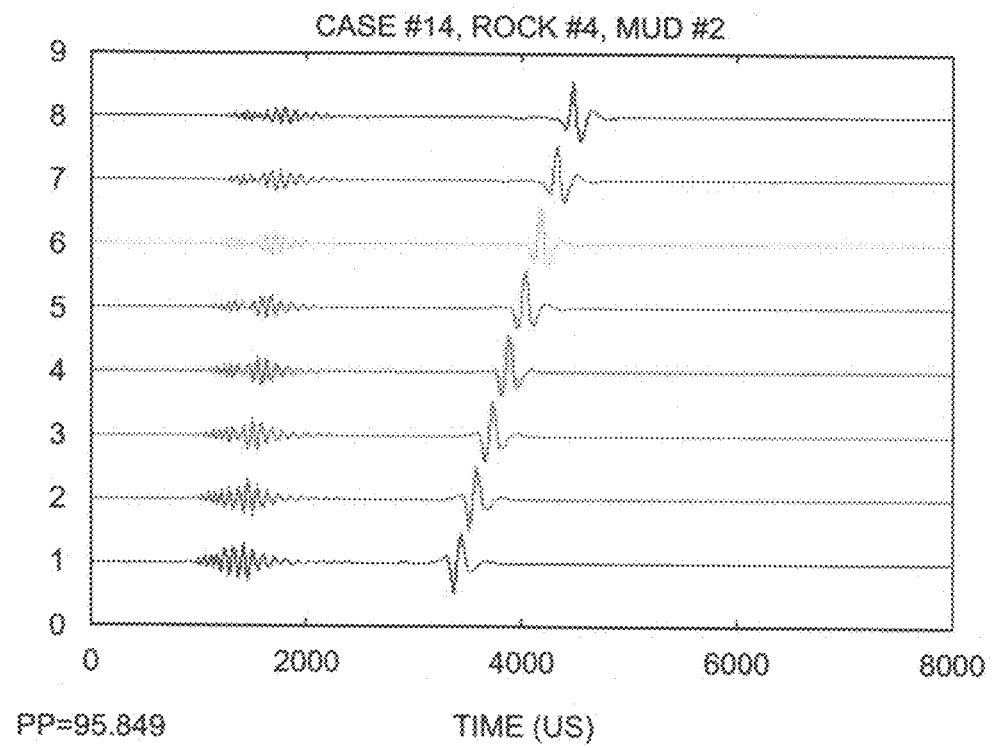
Figure 6C:
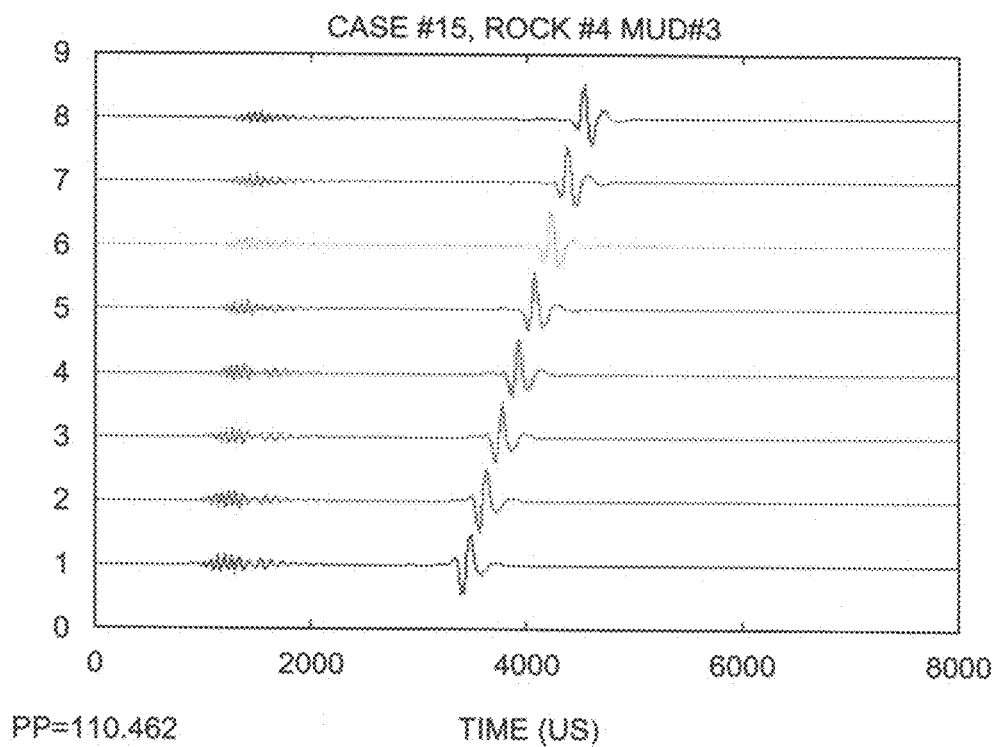
Figure 6D:
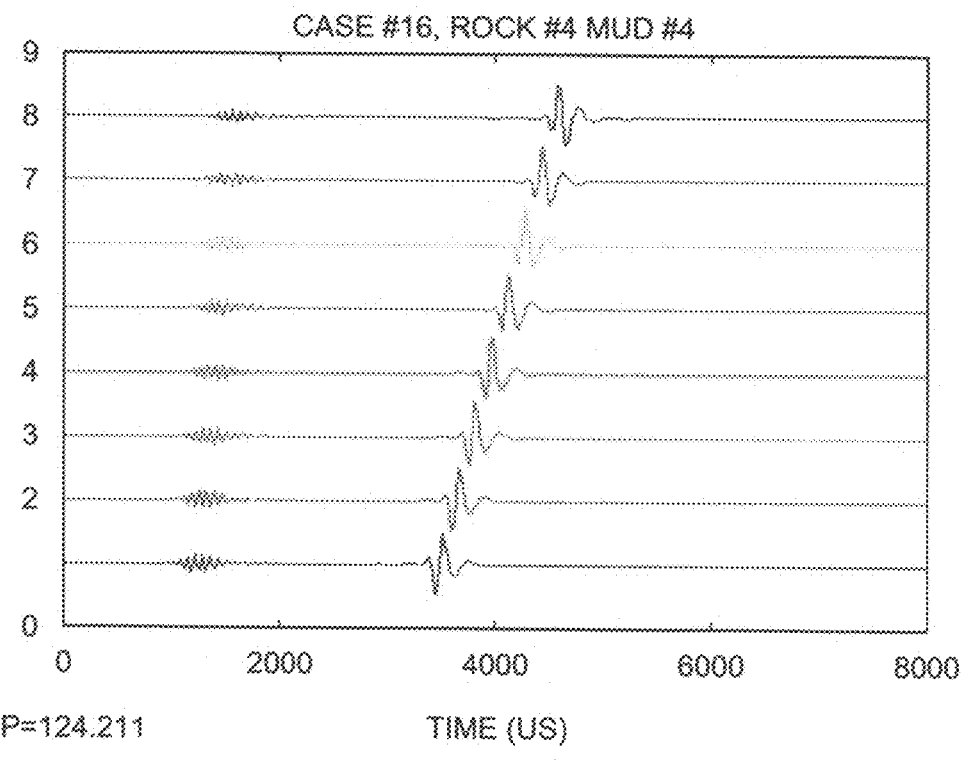
Figure 7A:
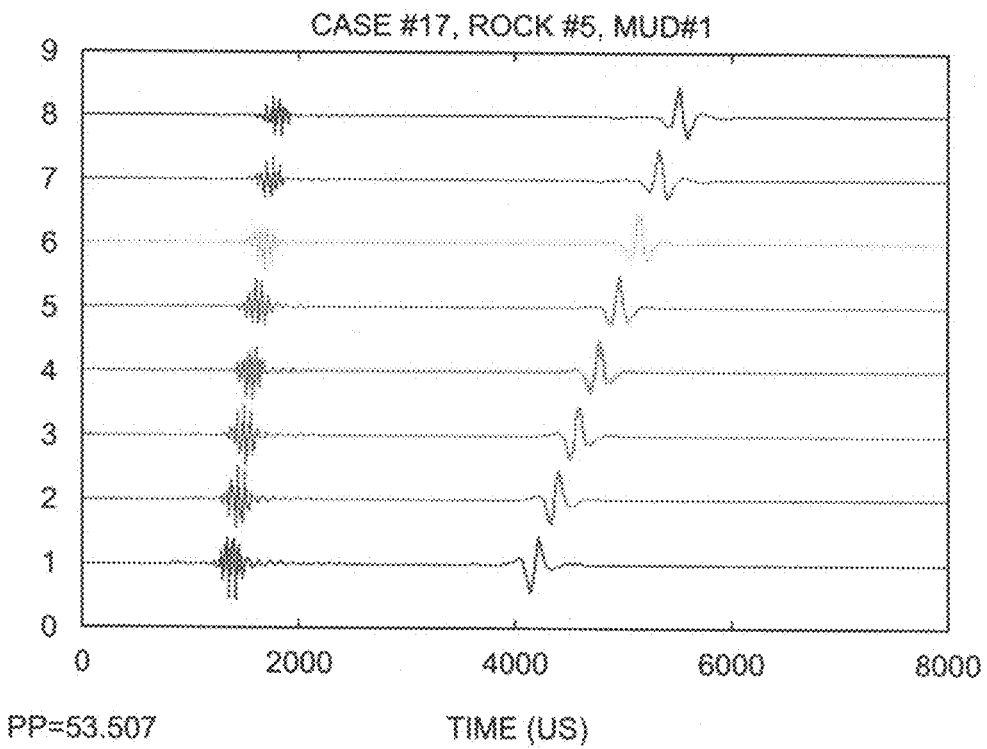
FIG. 7 shows waveforms for a slow formation in various muds to be processed by a method in accordance with one embodiment of the invention.
Figure 7B:
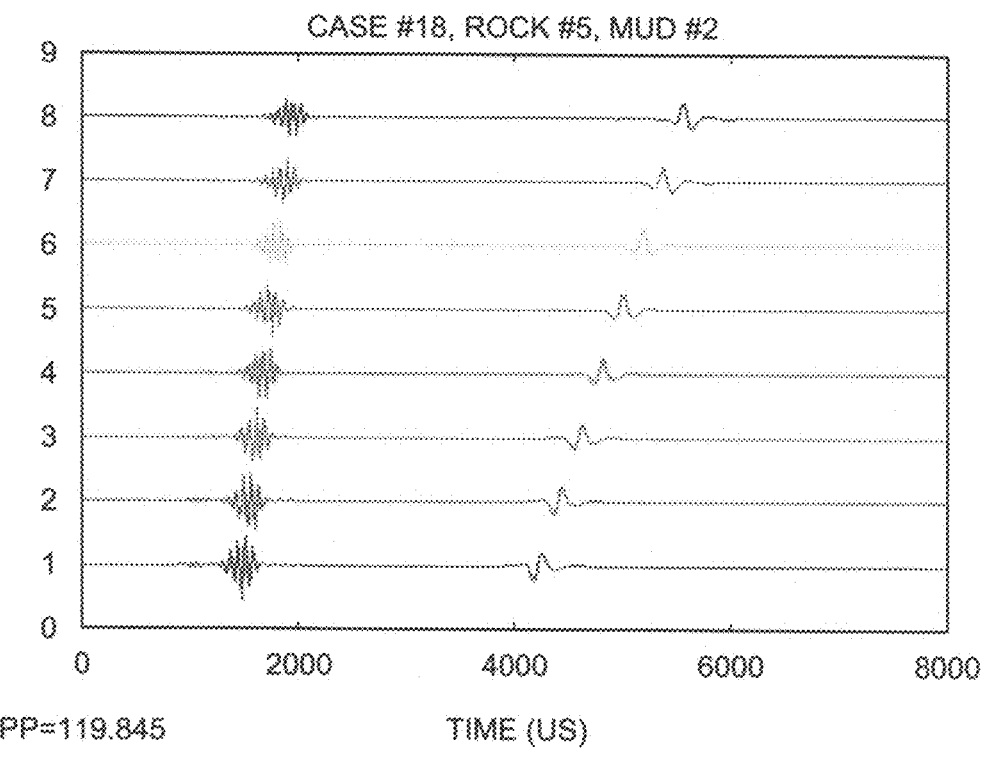
Figure 7C:
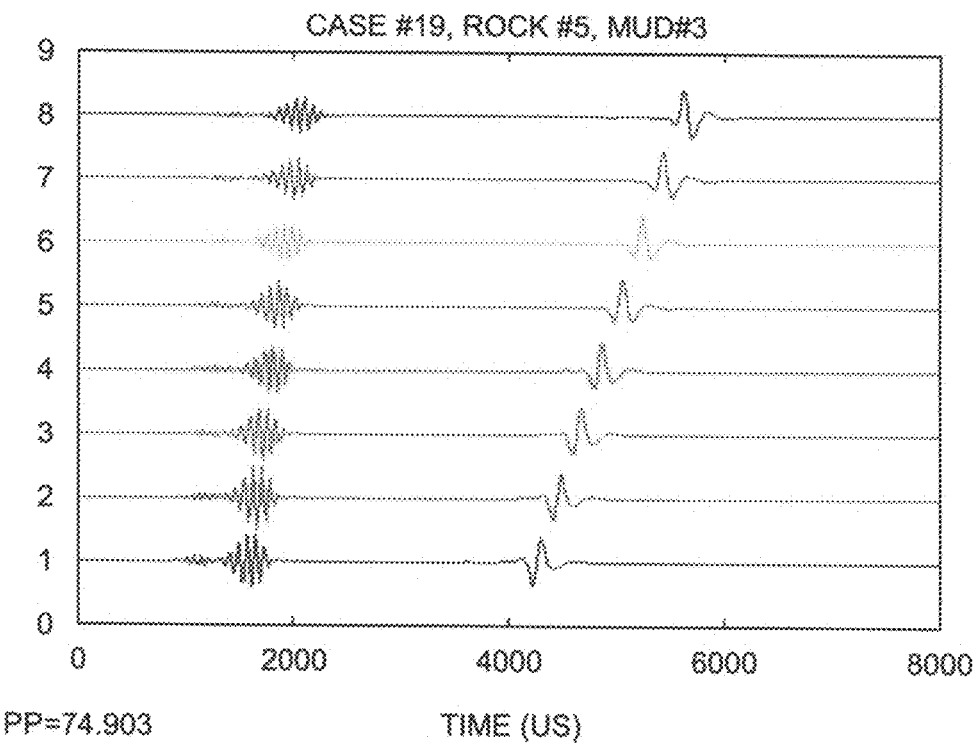
Figure 7D:
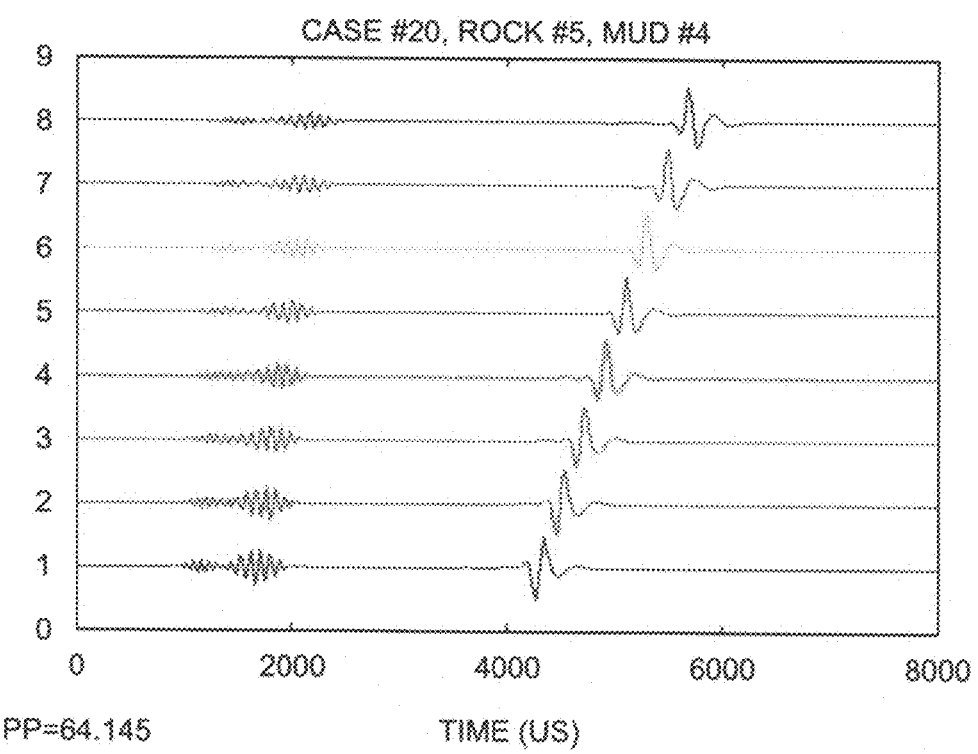

FIG. 2C shows a schematic of a process in accordance with one embodiment of the invention for inverting borehole-formation parameters from acoustic waveforms. As shown, the acoustic waveforms (211) may optionally be processed with time windowing (step 222), which helps to remove undesired signals outside of reasonable time ranges. The original (or the windowed) waveforms are then converted into the frequency domain by a suitable transformation (e.g., FT or FFT) (step 223). The frequency domain signals are back propagated using model dispersion curves to correct for dispersiveness of the signals (step 224). The back propagation produces back-propagated waveforms (B-P waveforms) (227), which are in the frequency domain. In accordance with some embodiments of the invention, the back-propagated waveforms may be used in the frequency domain in the following steps, without converting them back to the time domain by reverse Fourier transformation (or reverse FFT).

Coherence of the back-propagated waveforms (227) are then calculated (step 228). In some embodiments, the windowing (step 222) is not performed on the original waveforms. Instead, the windowing may be performed on the back-propagated waveforms (227). The processes of back propagation (step 224) and computing coherence (step 228) may be repeated iteratively by obtaining a new set of model dispersion curves that correspond to a different set of borehole-formation parameters (pathway A). These processes are repeated until the coherence meets a selected criterion, such as reaching a maximum or exceeding a threshold. Then, the borehole-formation parameters are output (step 240).

Alternatively, the iteration may be performed with the aid of a cost function that indicates the goodness-of-fit (pathway B). Various forms of cost functions may be used with embodiments of the invention. For example, some cost functions may be related to a difference between the measured dispersion curve (for example with Prony's method) from acquired waveforms (windowed or not) and the model dispersion curves. See Prony's method, in Parks and Burrus, "*Digital Filter Design*," New York: John Wiley & Sons, pp. 226-28 (1987). Alternatively, cost functions may be related to the coherence computed in step 229. As shown in FIG. 2B, one example of a cost function is defined as: cost function=1−coherence (see 216 in FIG. 2B). The iterative process minimizes the cost function to find a set of borehole-formation parameters that produce a minimal cost function or reduce the cost function to below a selected value (threshold). Then, some or all of the borehole-formation parameters corresponding to the model dispersion curves that produce the minimal cost function are output (step 240) to provide information on formation properties.

The model dispersion curves (225) used in the back propagation may be generated by a forward engine (215), which uses a borehole-formation model (226) having a set of borehole-formation parameters. The model dispersion curves may be computed as needed (i.e., on the flight) or pre-computed and stored in a database. Pre-computation of the model dispersion curves is preferred when the computational resources are limited, such as at a well site or downhole. If the dispersion curves are pre-computed and stored in a database, then the dispersion curves corresponding to the borehole-formation parameters may be retrieved from the database. If no dispersion curves correspond to the borehole-formation parameters, interpolation may be used to derive dispersion curves corresponding to the borehole-formation parameters. Various aspects of the forward engine will be described in more detail in a following section.

Referring again to FIG. 2B, the iterative process 216 may also use other parameters to improve the efficiency of computation. For example, the parameters used in time windowing (212) or the frequency (213) used in acoustic logging (fmin and fmax) may be used to limit the computation to a selected frequency range and/or slowness window. Inclusion of these limits has the effect of improving signal-to-noise ratio, as will be described in more detail in a later section. Furthermore, a set of initial borehole-formation parameters (214) may be input to the iterative process for the selection of the initial set of model dispersion curves. The initial borehole-formation parameters may be guesstimate values or obtained from other measurements. Alternatively, the initial borehole-formation parameters may be obtained by a coarse grit search of the parameter space, which is described in a following section. In addition, the iterative process (216) may include one or more feedback loops (217) to the forward model engine to request new model dispersion curves based on the updated parameters. Similarly, the iterative process (216) may include one or more feedback loops (218) to the waveform windowing module to obtain a new set of windowed waveforms.

The above-described fitting process (216 in FIG. 2B) is often accomplished with an algorithm that minimizes a cost function (or an indicator of goodness of fit). One of ordinary skill in the art would appreciate that various minimization algorithms may be used, such as linear least square fit or non-linear least square fit. FIG. 2B shows that a non-linear least square algorithm is used for the minimization. Specifically, the Levenberg-Marquardt algorithm is shown in FIG. 2B. See Marquardt, "*An Algorithm for Least-Squares Estimation of Nonlinear Parameters*," J. Soc. Ind. Appl. Math., Vol. II, No. 2, pp. 431-41 (1963). Levenberg-Marquardt algorithm was found to work quite satisfactorily for this type of problem. However, embodiments of the invention are not limited to the Levenberg-Marquardt algorithm. Other minimization algorithms known in the art, such as the Gaussian-Newton algorithm, may also be used.

Embodiments of the invention may use a forward engine (forward modeling) to produce model dispersion curves. The forward model may include parameters describing an acoustic tool, a borehole, and formations. These parameters are generally referred to as "borehole-formation parameters" in this description. The dispersion curves, in accordance with embodiments of the invention, may correspond to various borehole modes (Stoneley, dipole, quadrupole, or higher-order modes).

In accordance with some embodiments of the invention, the dispersion curves may be pre-computed based on a selected subset of borehole-formation parameters that are relevant to the measurement sites, while other borehole-formation parameters are held constant (based on other measurements or best guess values). For example, a 7-dimension database DC(DTc, ρb, DTm, ρm, HD, DTs, f) (i.e., dispersion curves as functions of DTc, ρb, DTm, ρm, HD, DTs, and frequency) is shown in FIG. 2B. The database typically comprises a large number of dispersion curves calculated for a selected set of discrete values for every borehole-formation parameter. Thus, each dispersion curve in the database corresponds to a grid point in the borehole-formation parameter space, which is a 7-dimension space in the example of FIG. 2B.

The grid points in the borehole-formation parameter space need not be equally spaced in constructing the database. Non-even grid points may be used to reduce the memory storage requirement without sacrificing accuracy. For example, denser grid points may be used over regions where the dispersion curves change rapidly, while sparser grid points are used over regions where dispersion curves change slowly. The non-even grid points may be used for some of the parameters (such as frequency and DTs) or all of the parameters.

Once the model dispersion curves (DC) database is available, the dispersion curve corresponding to a particular set of borehole-formation parameters can be selected from this database. If the dispersion curve corresponding to the particular set of parameters is not in the database, an interpolation algorithm may be used to compute the dispersion curve for any specific point in the parameter space. Any suitable interpolation algorithm known in the art may be used.

As noted above, a cost function (or penalty function) is typically used in a minimization process. Various cost functions may be used with embodiments of the invention. For example, a cost function ($\epsilon^2$) may be formulated as a normalized mean-squared error of the beam-former output, as shown below:

$$\epsilon^2 = 1 - \text{coherence}(DTc, \rho b, DTm, \rho m, HD, DTs, T, TWL, DTsw, fmin, fmax).$$

The coherence may be computed from back-propagated waveforms. Using the cost function define above, the object of the minimization is to find a set of parameters that produce a minimum $\epsilon^2$ or a maximum coherence.

While a coherence function to be used in the above-described cost function may be defined in various forms, the following presents an exemplary coherence function to demonstrate utilities of embodiments of the invention. First, let $x_i(t_j)$ be the j-th time sample of windowed waveform from the i-th receiver, where i=1, ..., $N_{rec}$, and j=1, ..., $N_{pt}$, and let $X_i(f_j)$ be the j-th frequency component of the discrete Fourier transform (or FFT) of the windowed waveform from the i-th receiver, where i=1, ..., $N_{rec}$. In addition, let DC(DTc, ρb, DTm, ρm, HD, DTs, f) be the model dispersion curves. Then, the back-propagated waveforms in the frequency domain can be written as:

$$XB_i(f_j) = X_i(f_j) \cdot B_i(f_j),$$

where $B_i(f_j) = e^{[i\, 2\pi f_j \cdot (DC(f_j) - DTsw \cdot dt/dz) \cdot (i-1) \cdot dz]}$ is the back-propagation operator. Here, dz is the inter-receiver spacing, dt is the time sampling interval, and DTsw is the time window move out slowness, which may be slightly different from the DTs value due to discrete time sampling.

The narrow band beam-former output, which is an averaged j-th complex spectrum of the back-propagated waveforms over the array, may then be defined as:

$$Y(f_j) = (\Sigma_{i=1,Nrec} XB_i(f_j))/N_{rec}.$$

Accordingly, the averaged energy in the j-th spectral component over the array is:

$$E(f_j) = (\Sigma_{i=1,Nrec} (X_i(f_j) \cdot X_i(f_j)^*))/N_{rec},$$

where * is symbol for complex conjugate, and the coherence and the normalized mean squared error of the beam-former at the j-th frequency component are:

$$Coh(f_j) = (Y(f_j) \cdot Y(f_j)^*)/E(f_j),$$

$$\epsilon^2(f_j) = (\Sigma_{i=1,Nrec}(X_i(f_j) - Y(f_j)) \cdot (X_i(f_j) - Y(f_j))^*))/(Nrec \cdot E(f_j)) = 1 - Coh(f_j).$$

Over the frequency range limited by [fmin fmax], the total coherent energy from the averaged complex spectrum of the back-propagated waveforms over the array is:

$$Yc = \sum_{fmin}^{fmax} (Y(f_j) \cdot Y(f_j)^*).$$

The total energy from the averaged energy spectrum of the waveforms over the array is given as, $$Et = \sum_{fmin}^{fmax} (E(f_j) \cdot E(f_j)).$$

Within this frequency range, the overall coherence and the normalized mean squared error of the beam-former can be written, respectively, as:

$$\text{Coherence} = \frac{\sum_{fmin}^{fmax} E(fj) Coh(fj)}{\sum_{fmin}^{fmax} E(fj)} = Yc / Et,$$

$$\varepsilon^2 = \frac{\sum_{fmin}^{fmax} E(fj) \varepsilon^2(fj)}{\sum_{fmin}^{fmax} E(fj)} = 1 - \text{coherence}.$$

In the above description, the cost function, $\epsilon^2$, is defined as the normalized mean-squared error of the beam-former output. However, one of ordinary skill in the art would appreciate that other functional forms of a similar cost function may also be used.

The general form of the cost function described above makes it possible to match, in the least square sense, the measured waveforms to a tool-borehole-formation model described by: (1) optimum borehole-formation parameters (DTc, ρb, DTm, ρm, HD, and DTs), (2) an optimum time window defined by T, TWL, and DTsw, and (3) an optimum frequency range defined by fmin and fmax. Thus, the parameters describing the borehole-formation properties may be derived from the measured waveforms by minimizing the above cost function.

The example of cost function, $\epsilon^2$, described above contains 11 parameters: DTc, ρb, DTm, ρm, HD, DTs, T, TWL, DTsw, fmin, and fmax. The minimization process finds a set of parameter values that produce a maximum dispersion-curve-back-propagated coherence, and hence a minimum cost function. This is a typical minimization problem that can be solved by many different algorithms, such as a linear or non-linear minimization algorithm. However, depending on the complexity of the cost function, the true minimum (global minimum) may or may not be easily located. The efficiency or likelihood of success of parameter inversion depends on two important aspects: (a) whether the algorithm converges to the right answer robustly; and (b) the speed of the convergence. It is well known in the science of inversion that the more parameters to invert for, the less robust the solution is, while computational time for the inversion increases drastically with the number of parameters.

In the example described above, the cost function includes 11 parameters, i.e., an 11-dimension space cost function. The Levenberg-Marquardt algorithm was found to be efficient in finding the minimum of such a cost function. Other linear or non-linear minimization algorithms, such as various modifications of the Gauss-Newton algorithm, may also be used. If efficiency is a concern, some of the parameters may be constrained at selected values (which may be derived from other information or from guesstimates), and only a subset of the borehole-formation parameters are minimized. With this approach, the constrained parameters are preferably those having less influence on the cost function, i.e., the cost function has little sensitivity to variations in the values of these parameters (i.e., "insensitive parameters"). Minimization with respect to a subset of parameters is desirable when computational resources are limited, for example in downhole environments.

Therefore, in accordance with some embodiments of the invention, not all parameters in the cost function need to be treated as "free parameters" that affect the cost function. Instead, some of the parameters are constrained at selected values. These parameters are preferably "insensitive parameters." The insensitive parameters may be identified by sensitivity analysis, which may be first performed on the parameters to determine and rank their sensitivities. Alternatively, the sensitive (or insensitive) parameters may be selected based on other knowledge (e.g., prior study or information related to the particular well/formation) without performing a sensitivity study. For example, for borehole quadrupole modes, DTs and DTm are known to be the most sensitive parameters. Once the sensitive parameters are selected or determined, the inversion may be performed on some or all of the sensitive parameters and leave the rest of the parameters fixed at selected values, which may be reasonable guess values. The reasonable guess values, for example, may be derived from other measurements (e.g., HD from bit size or caliper measurement, DTc from monopole measurement, etc.) or simply from guesstimates.

As an example, for borehole quadrupole modes, an inversion based on DTs and DTm will make the most significant improvement over the conventional DSTC method in terms of getting an accurate DTs. In accordance with some embodiments of the invention, the less sensitive parameters may be included in the inversion after the sensitive parameters have been derived. In accordance with other embodiments of the invention, the less sensitive parameters may be left at the reasonable guess values without ever being included in the inversion, because their accurate inversion is unlikely anyway. Inversion for the less sensitive parameters will typically make an insignificant improvement to the inverted DTs values.

In accordance with some embodiments of the invention, the time window (212 in FIG. 2B) and frequency range (213 in FIG. 2B) parameters may be used to enhance the signal-to-noise ratios and the coherence values by optimal placement of the time window and optimal selection of the frequency range for processing. For noisy waveform data that are laden with drilling-related noises and other unwanted wave components (such as fluid modes), including the window and frequency range parameters into the inversion may significantly improve the convergence. However, possible enhancement by including extra (e.g., 5) "free" (unconstrained) parameters may be offset by the longer computational time. Thus, one may decide whether to include these parameters based on the quality of the data. As will be shown later, for nominally noisy data, it is possible to obtain reliable inverted DTs results with fixed window and frequency range parameters under a wide range of formation conditions. Therefore, it may be cost effective to fix these additional parameters for routine inversion of all data, and only include these extra parameters in the inversion of very noisy data, e.g., over noisy zones.

A good set of initial guess values of the borehole-formation parameters can help speed up the parametric inversion. As noted above, the initial guess values of the borehole-formation parameters may be derived from related measurements or from guesstimates. Alternatively, the initial guess values may be derived from a coarse-grid search for the minimum of the cost function. This alternative approach is feasible or desirable when a fast forward engine is available to compute the dispersion curves. The parameter values at the "global" minimum of the cost function in the coarse-grid space may then be used as the initial guess values in a fine-grid search. As will be shown later in the model waveform examples, this strategy is very robust, and the inversions converge to correct answers for a wide range of formation and mud conditions.

Some embodiments of the invention may be implemented for downhole application, which may be performed in real-time. However, in cases of limited downhole computing resources, the real-time application of the inversion techniques of the invention may be limited to just inverting for DTs and DTm parameters, while keeping other borehole-formation, window, and frequency band parameters fixed. In this manner, a high quality DTs log could be efficiently derived and sent uphole. The small environmental correction due to errors in the "fixed" values of the less sensitive borehole-formation parameters (ρb, ρm, HD) can be performed uphole using a technique disclosed in a co-pending U.S. patent application Ser. No. 10/904,035, entitled "*Methods and Systems for Sonic Log Processing*," by Wu, filed on Oct. 20, 2004. This application is incorporated herein by reference in its entirety. One of ordinary skill in the art would appreciate that improved downhole computing capabilities will allow for the implementation of more elaborate inversions with more free parameters.

Modeling studies demonstrate the usefulness of the invention. In one such modeling, a set of simulated quadrupole waveforms were generated, which simulated the results obtained with an idealized tool on a drill collar in the center of a mud-filled borehole through various formations. The ID and OD of the logging tool are 2.3 in. (5.8 cm) and 4.82 in. (12.2 cm), respectively. The transmitter-to-first-receiver (TR) distance is 7 ft (2.1 m), and the receiver-receiver (RR) distance is 4 inches (10.1 cm). There are 8 receivers in the waveform array. The source used in this study was a broadband quadrupole. The sampling interval of the waveforms was 20 μs. The model assumed a smooth collar without an attenuator between the transmitter and the receiver array. Therefore, the modeled waveforms might include more collar arrivals than those from an actual tool.

Five different formations and four different mud properties were used in the modeling study. The properties of the formations and muds that were used are listed in Table 1 below. The properties of the five formations are representative of very fast to very slow formations, and the four mud properties span the full range of possible muds—from very fast water-based mud to very slow oil-based mud. These parameters produced 20 different combinations of formation and mud properties.

TABLE 1

Parameter values for model waveforms

| Formation (5 cases) | | | Mud (4 cases) | | Borehole |
|---|---|---|---|---|---|
| DTc (us/f) | DTs (us/f) | Rhob (g/cc) | DTm (us/f) | Rhom (g/cc) | Diameter (in) |
| 60 | 102 | 2.5 | 185 | 1.3 | 6.5 |
| 70 | 202 | 2.4 | 205 | 1.4 | — |
| 100 | 302 | 2.3 | 225 | 1.5 | — |
| 130 | 402 | 2.2 | 245 | 1.6 | — |
| 160 | 502 | 2.1 | — | — | — |

These 20 cases of modeled waveforms were concatenated together to mimic a 20-frame data record. The 20 cases were arranged in the following manner: Case #1 through #4 (FIG. 3) were for rock #1 with mud #1 through #4, Case #5 through #8 (FIG. 4) were for rock #2 with mud #1 through #4, . . . , Case #17 through #20 (FIG. 7) were for rock #5 with mud #1 through #4.

In each of FIGS. 3-7, panels (A)-(D) represent muds #1-4, respectively. For faster formations (rocks #1 and #2), the collar arrivals, the borehole quadrupole mode, and the fluid modes were commingled in the time domain (see FIG. 3 and FIG. 4). For the slower formations (rocks #3, #4 and #5), the borehole quadrupole mode became separated from (and lagged behind) the collar arrivals and the fluid modes (see FIG. 5, FIG. 6 and FIG. 7). The time support region of the quadrupole mode for this wide range of formations varied from 800 to 7000 μs.

Figure 8A:
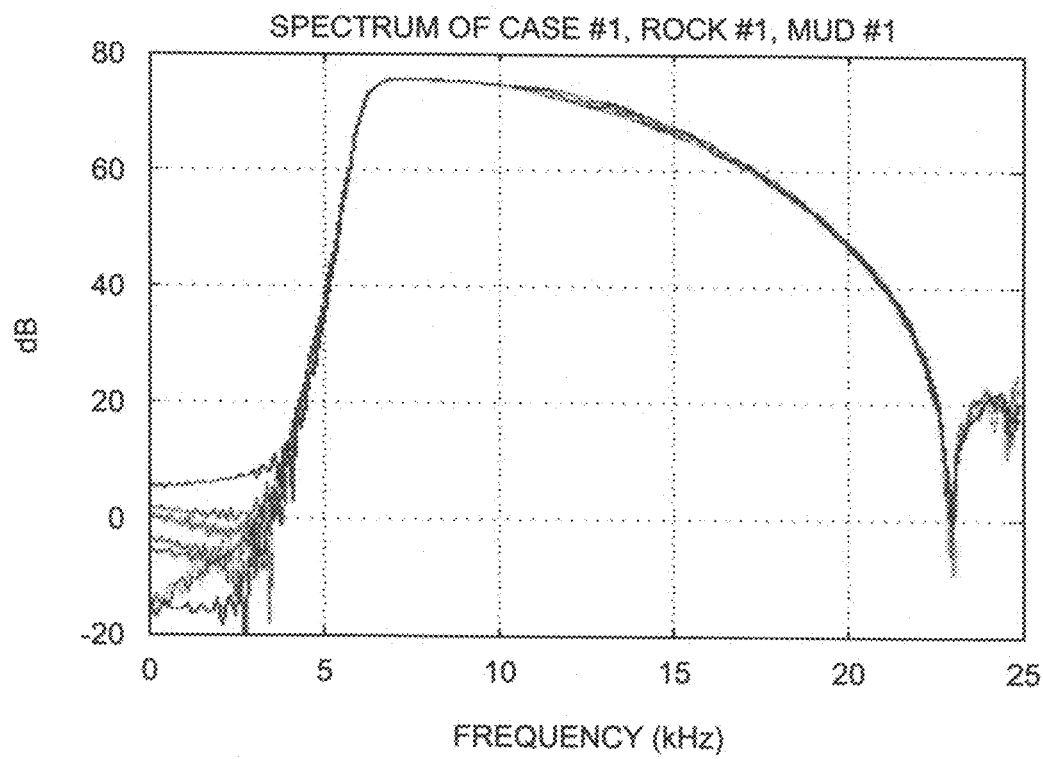
FIG. 8 shows frequency domain signals for various formations in a mud in accordance with one embodiment of the invention.
Figure 8B:
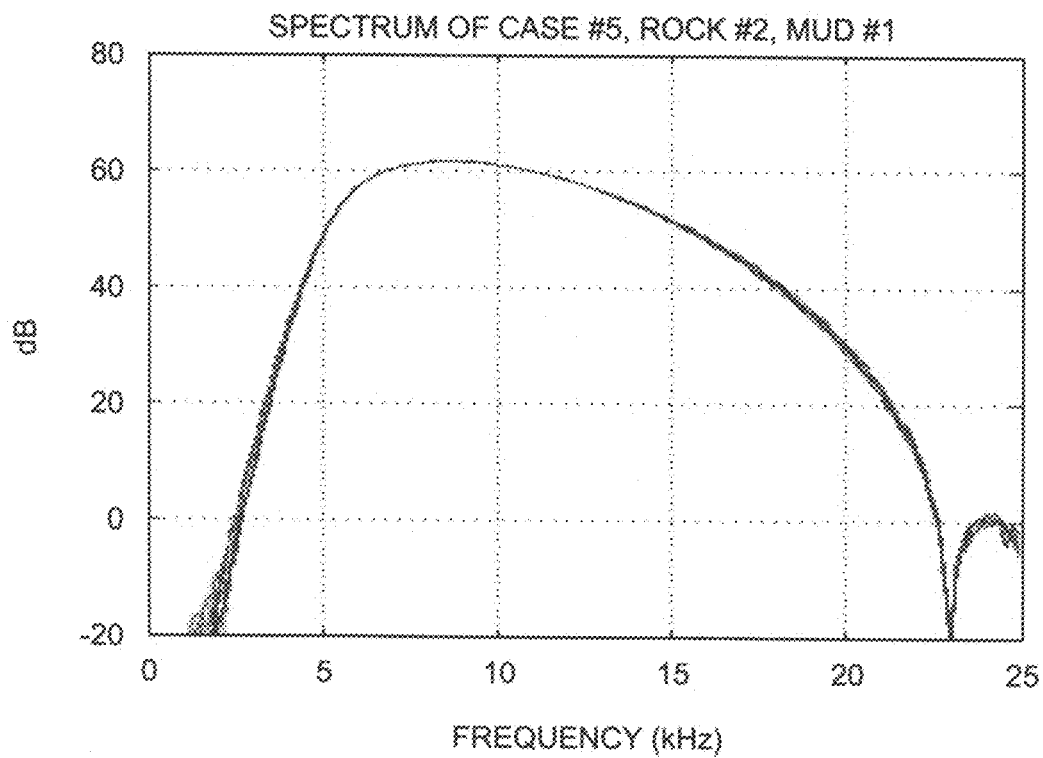
Figure 8C:
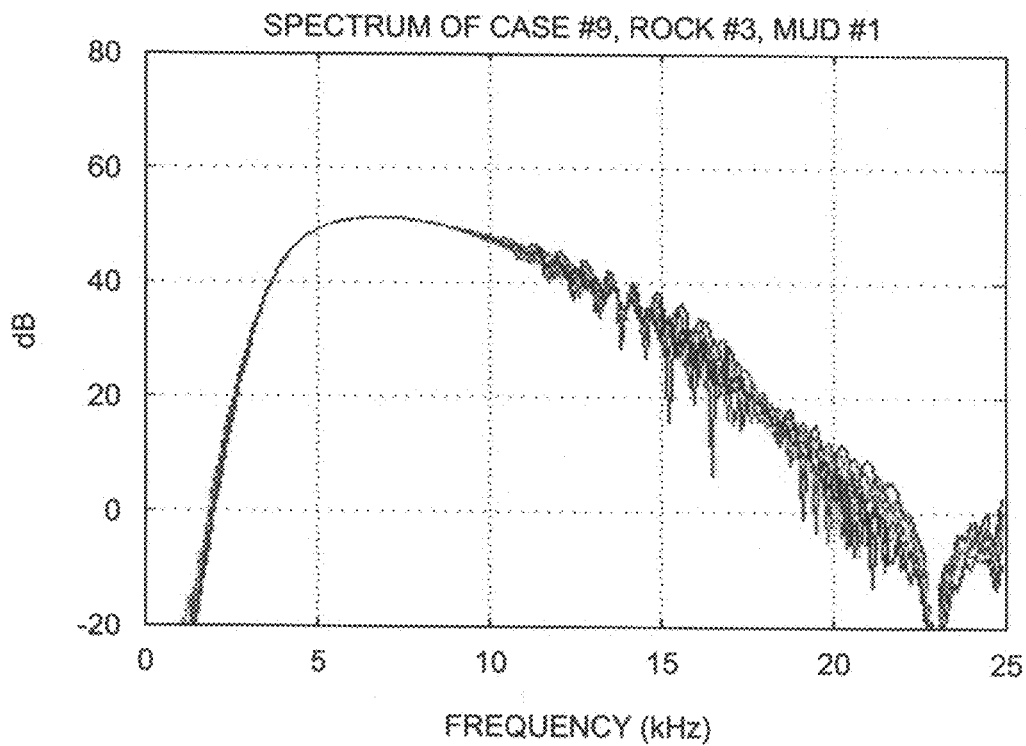
Figure 8D:
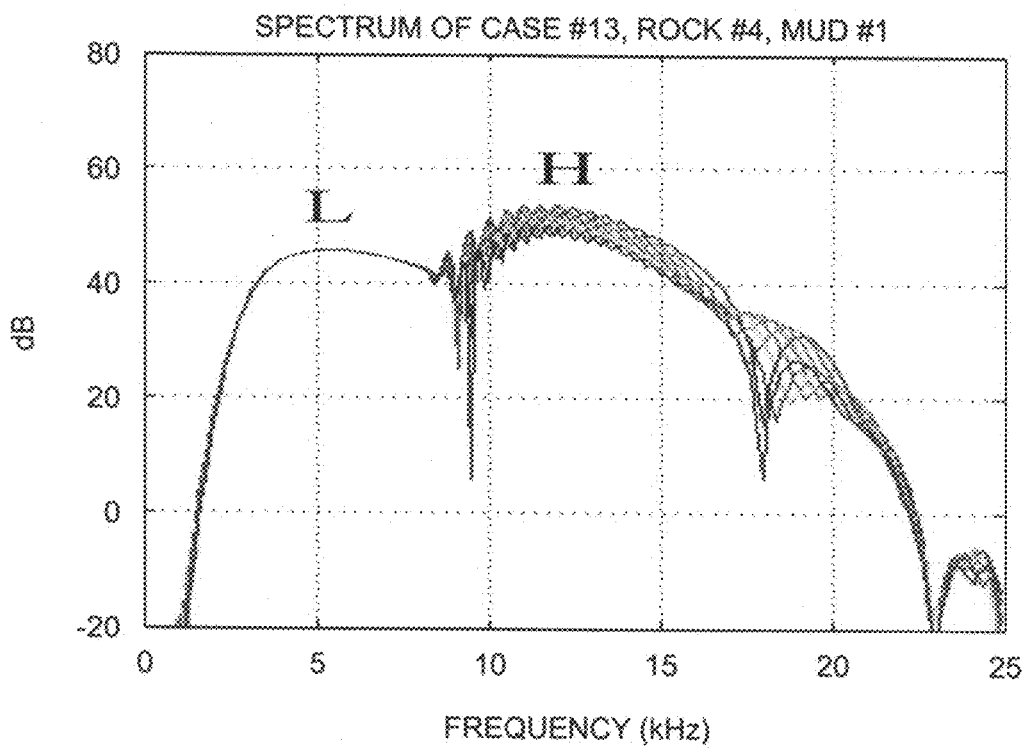
Figure 8E:
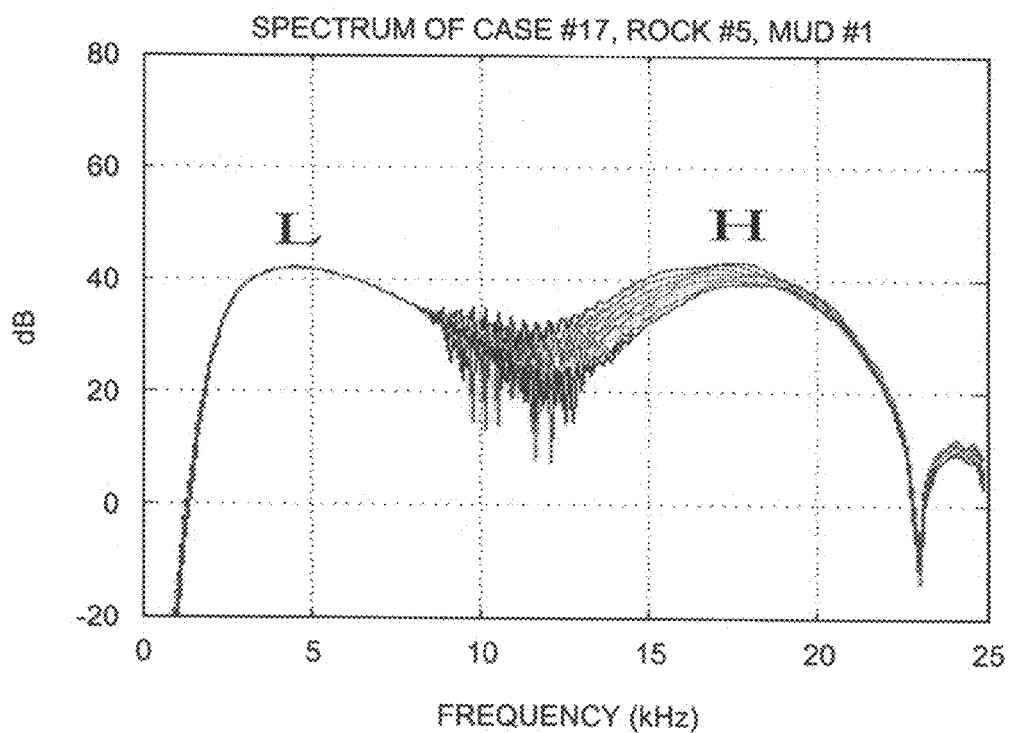
Figure 9A:
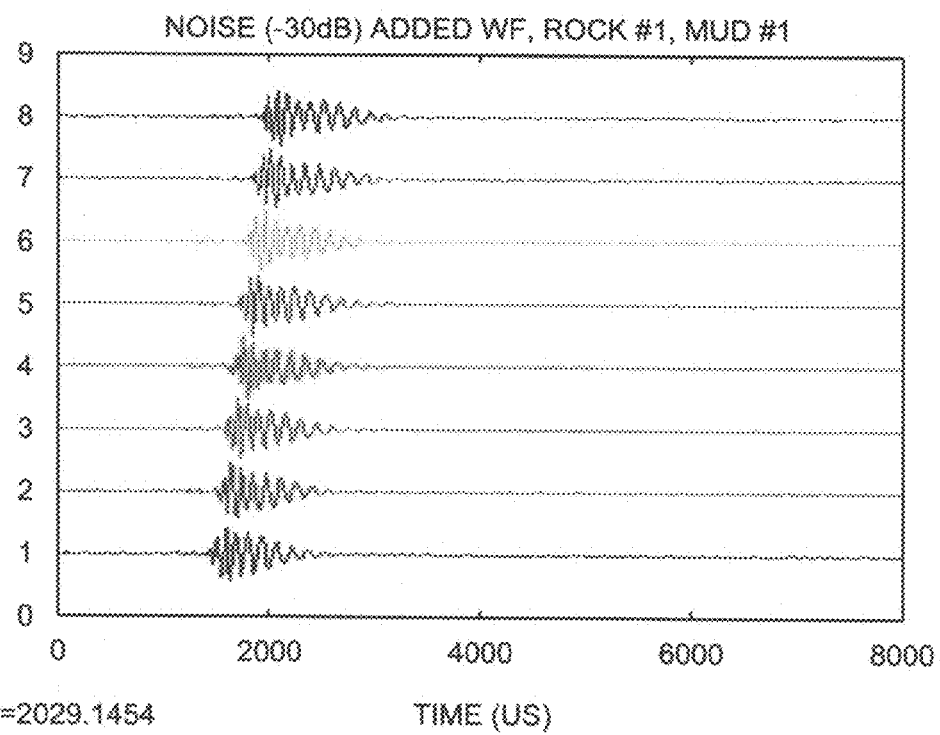
FIG. 9 shows waveforms with –30 dB noise levels for various formations in a mud to be processed by a method in accordance with one embodiment of the invention.
Figure 9B:
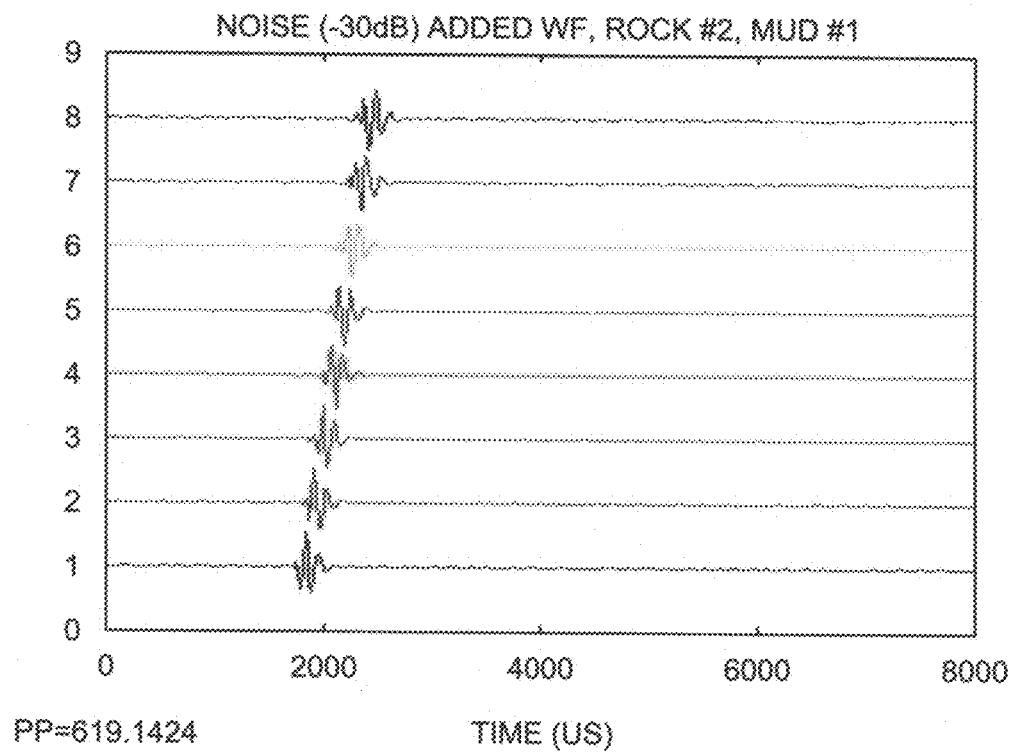
Figure 9C:
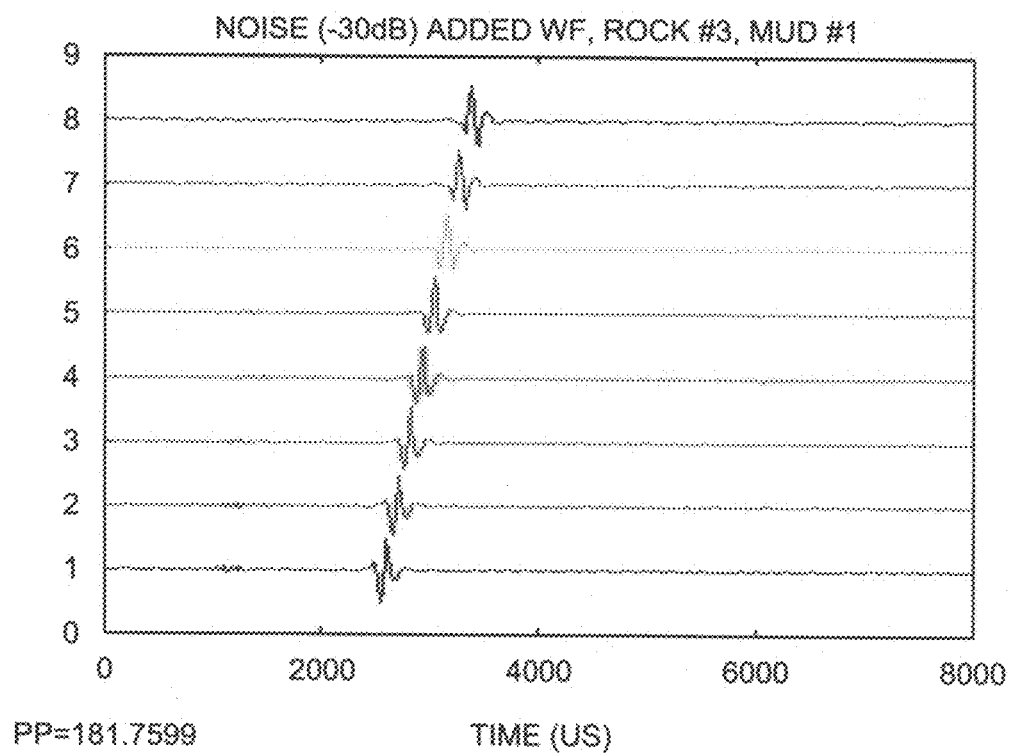
Figure 9D:
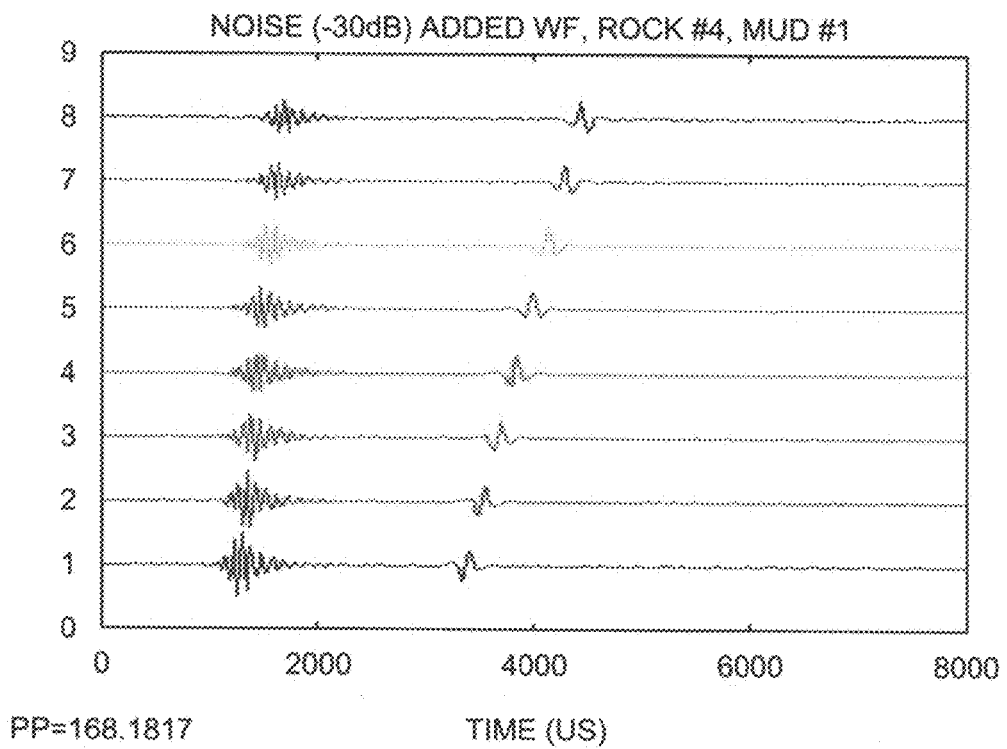
Figure 9E:
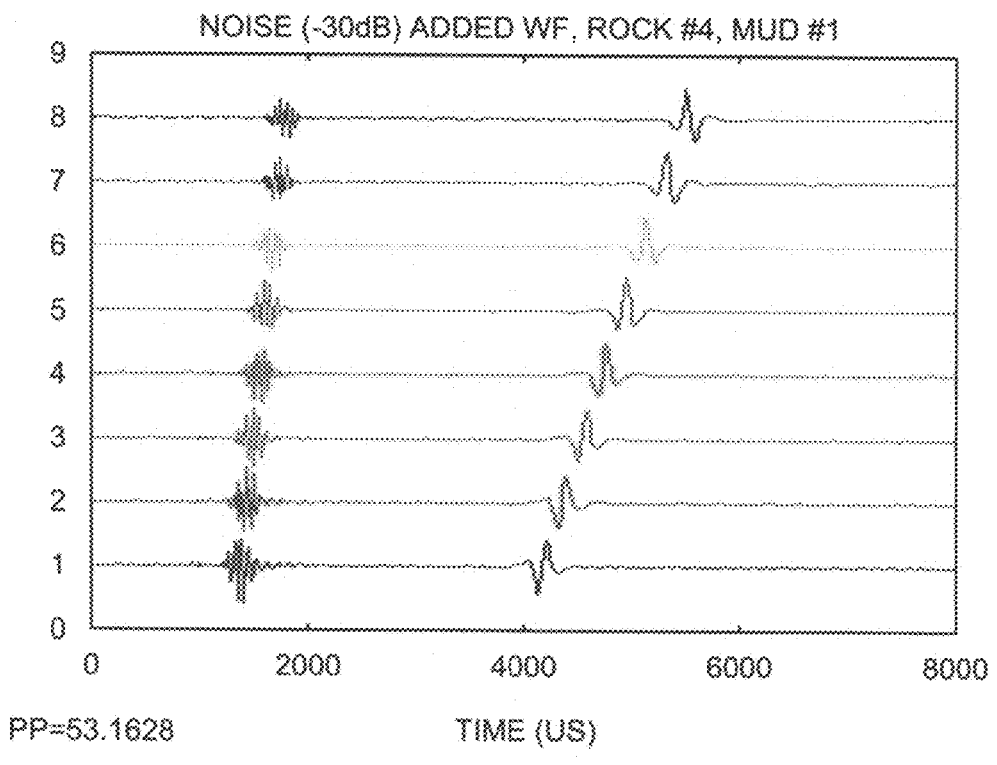
Figure 10A:
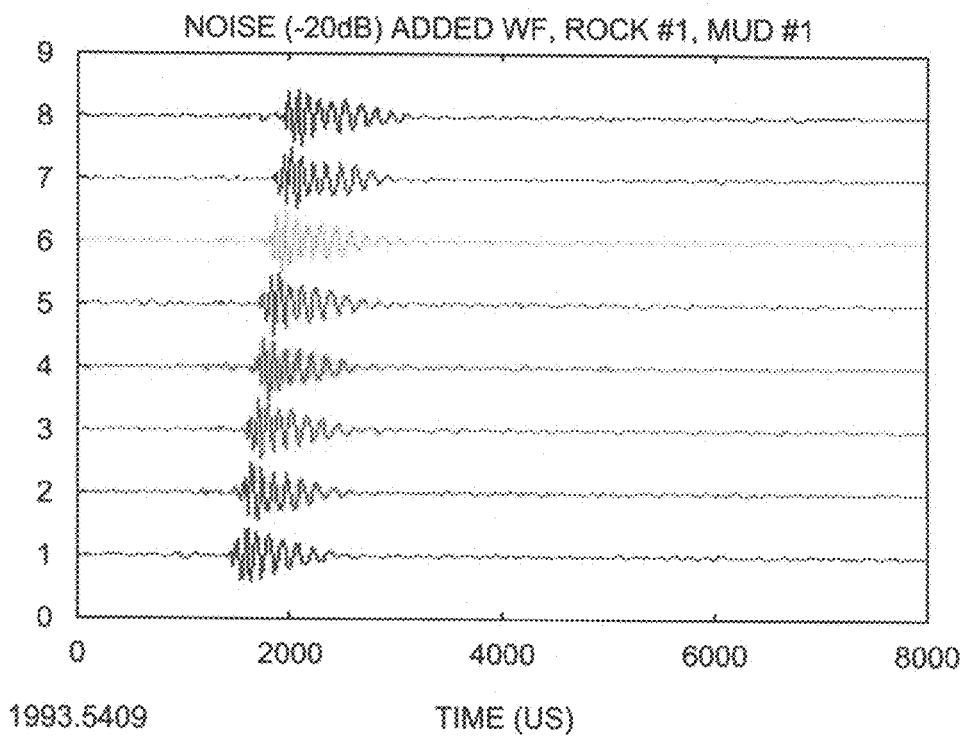
FIG. 10 shows waveforms with –20 dB noise levels for various formations in a mud to be processed by a method in accordance with one embodiment of the invention.
Figure 10B:
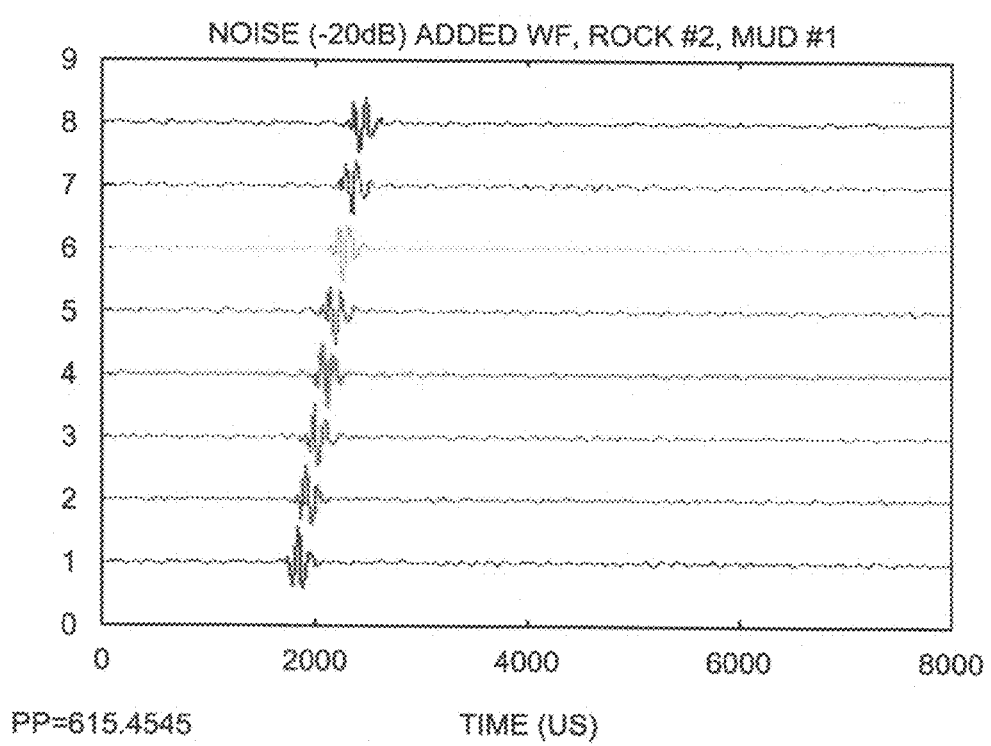
Figure 10C:
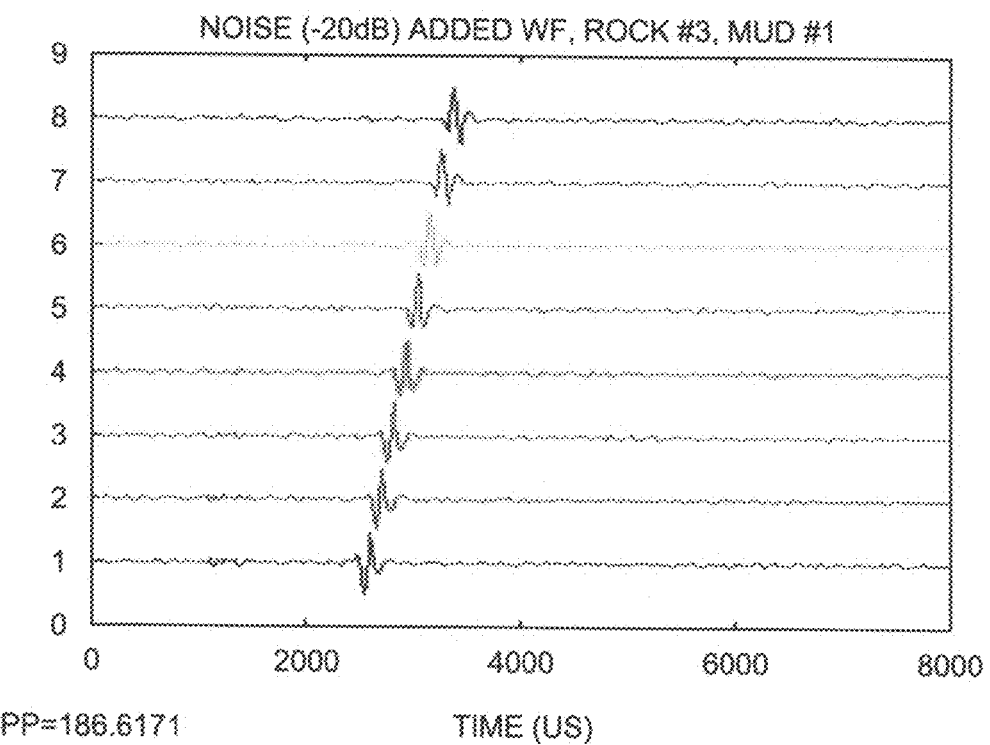
Figure 10D:
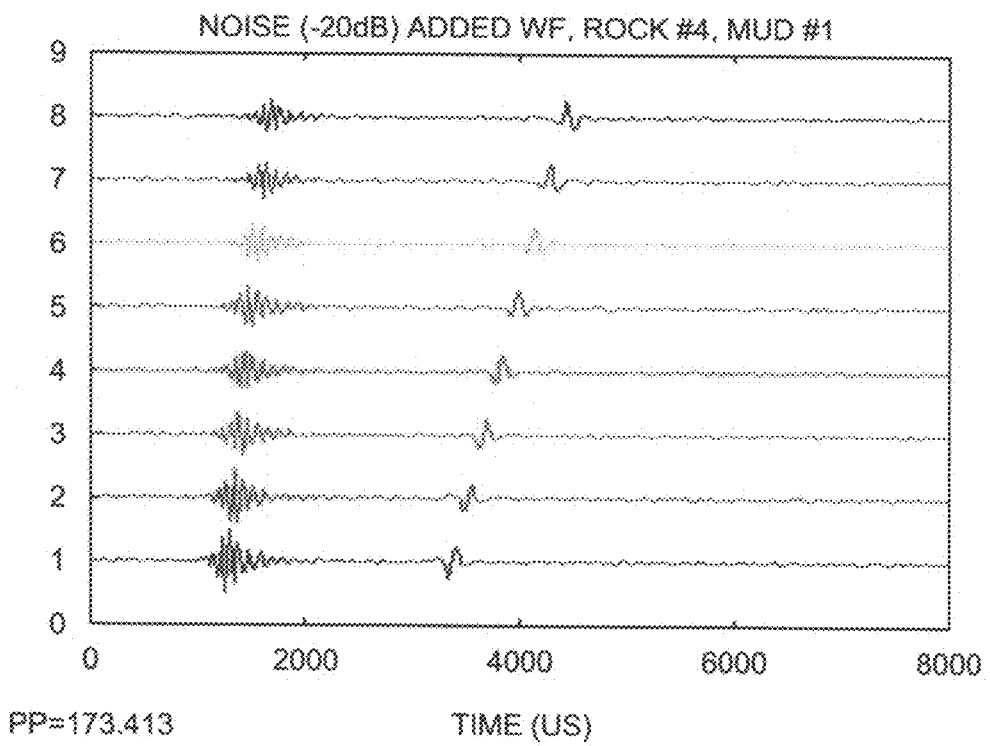
Figure 10E:
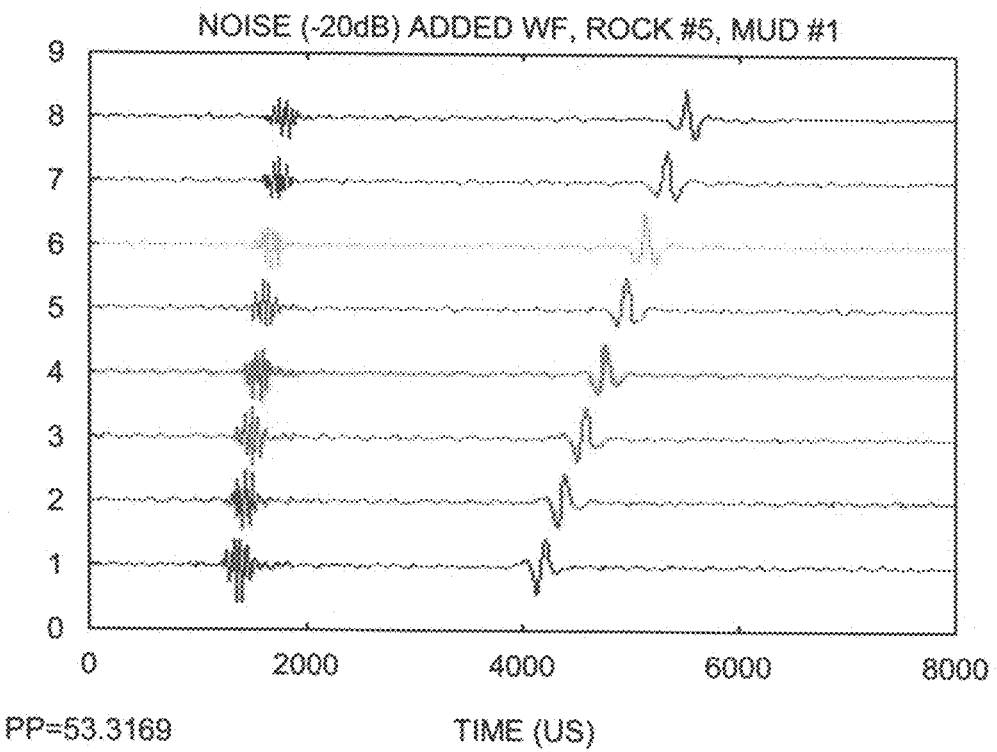
Figure 11A:
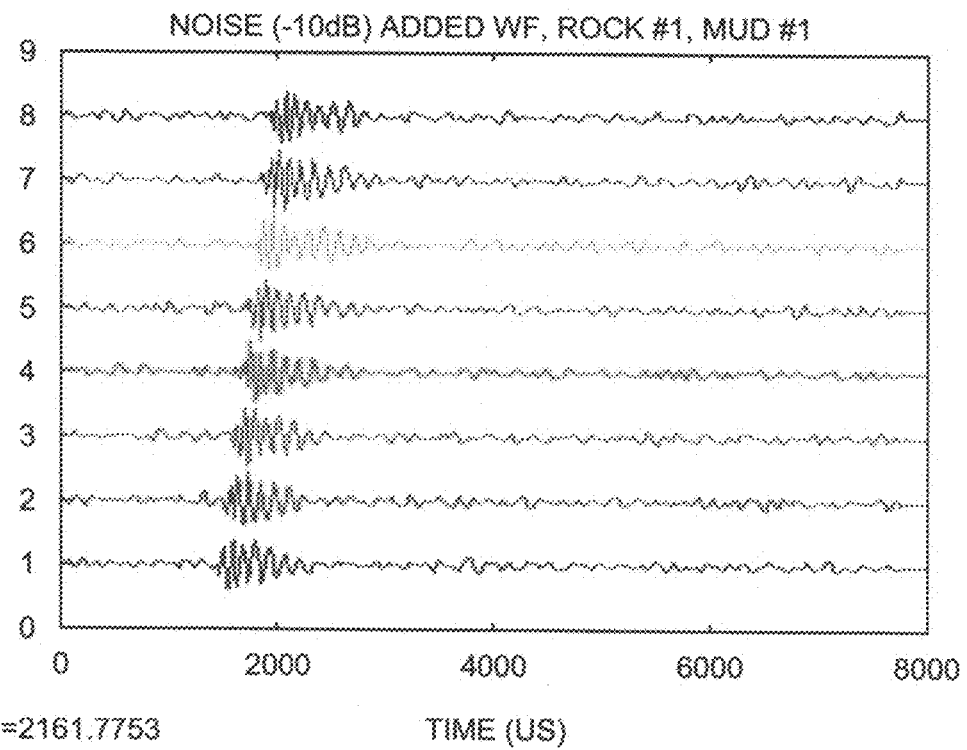
FIG. 11 shows waveforms with –10 dB noise levels for various formations in a mud to be processed by a method in accordance with one embodiment of the invention.
Figure 11B:
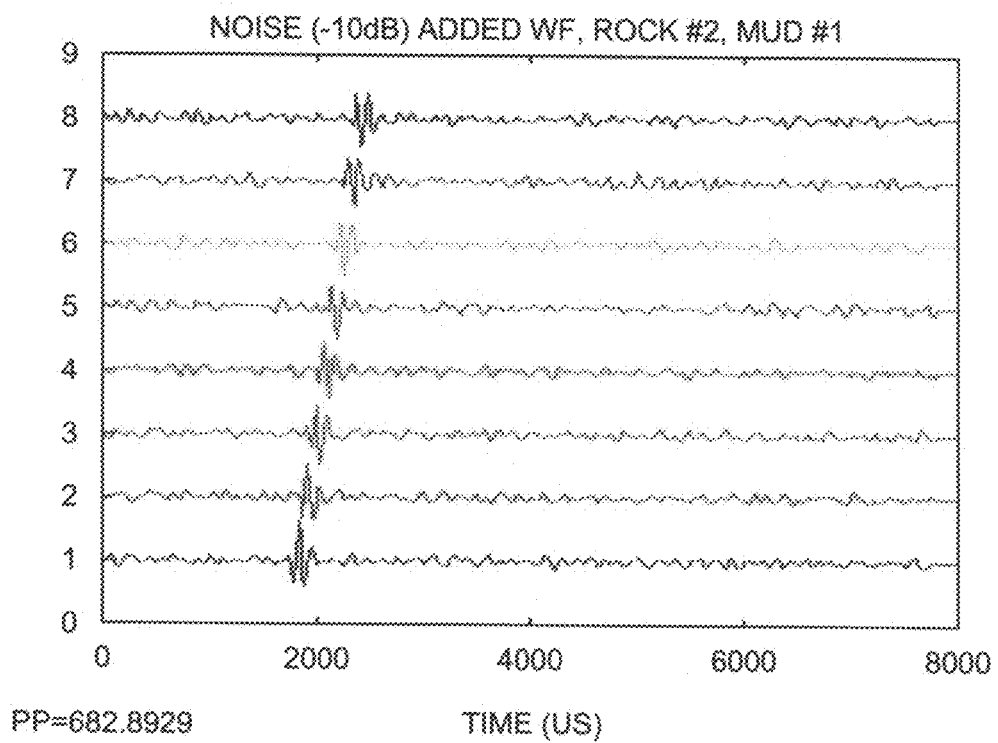
Figure 11C:
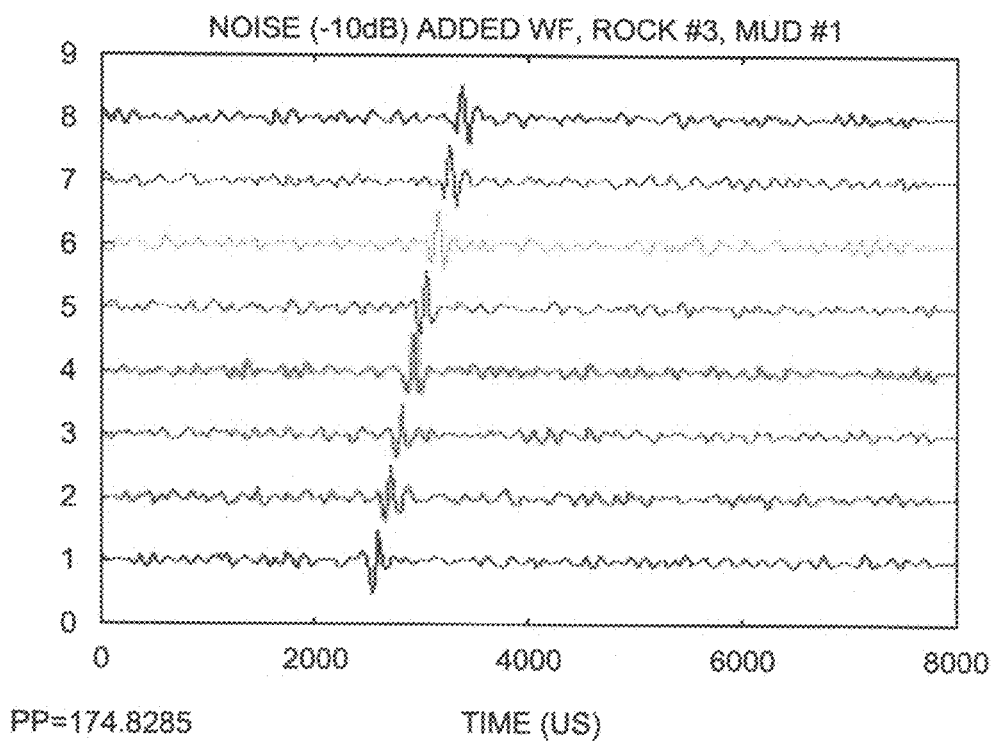
Figure 11D:
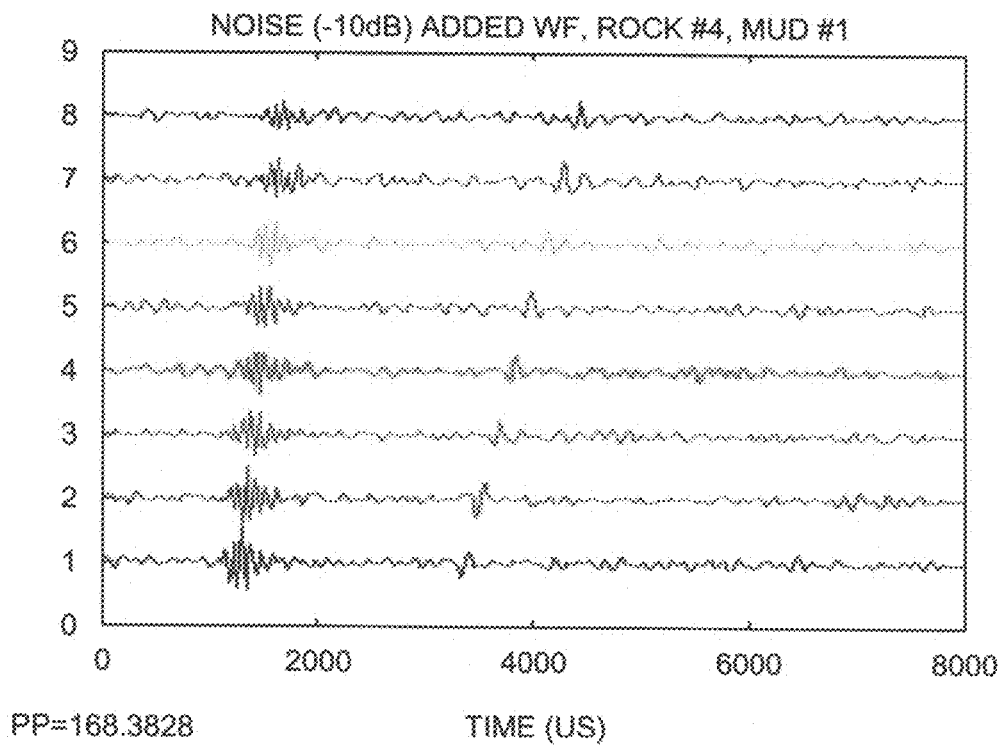
Figure 11E:
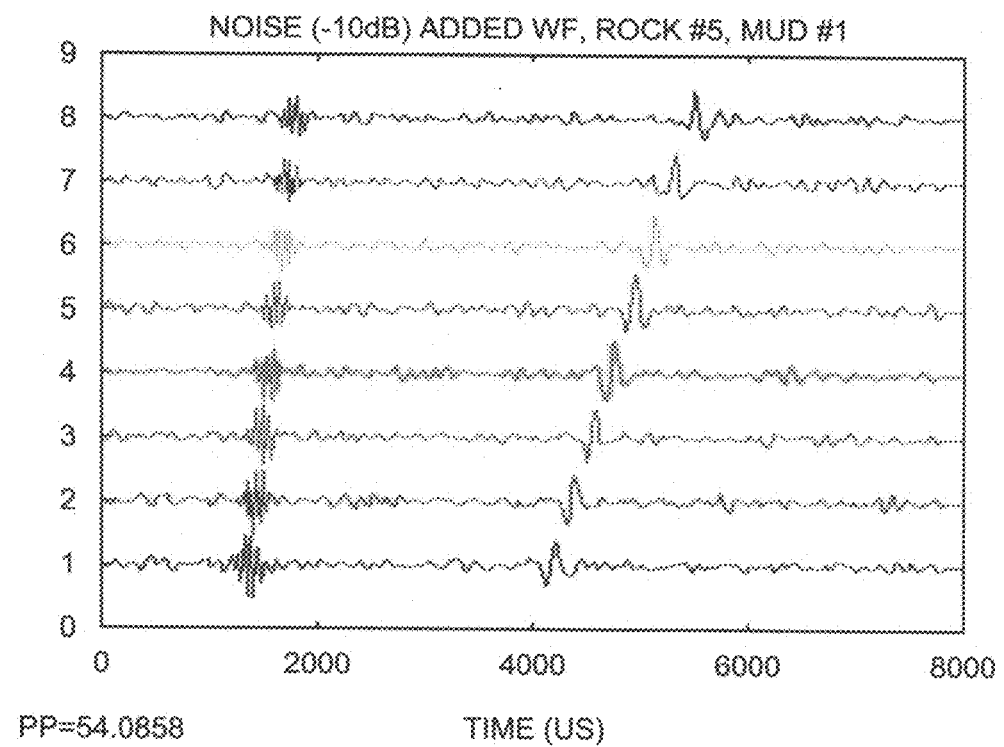
Figure 12A:
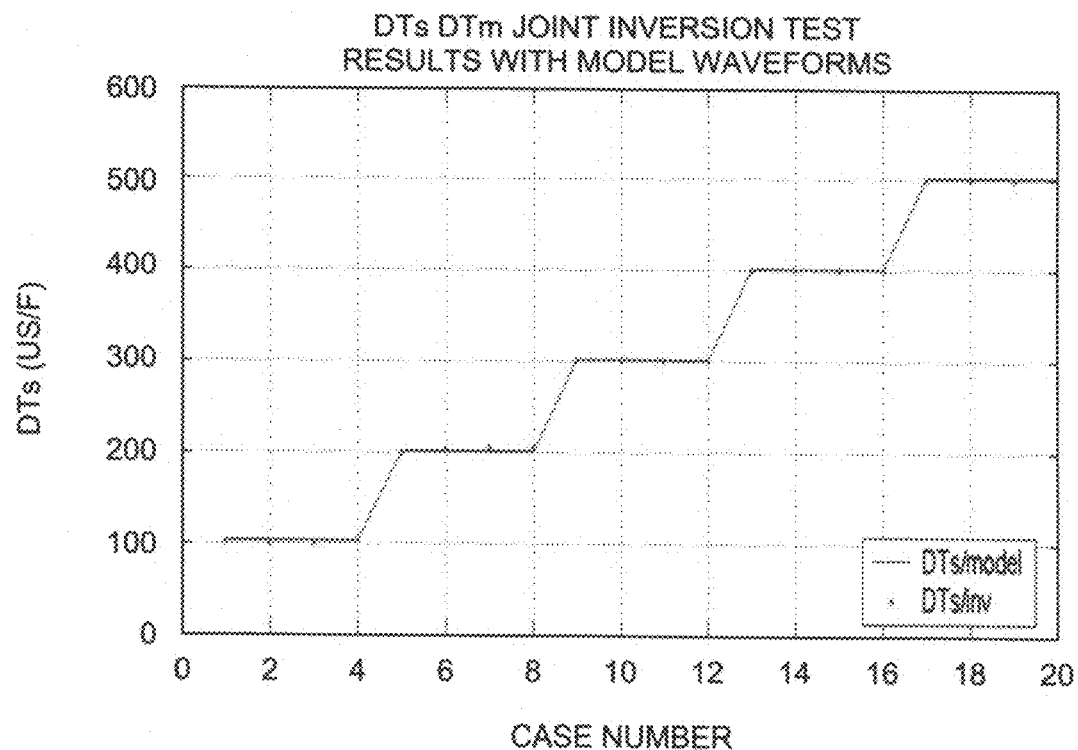
FIG. 12 shows results of various parameters as derived from noise-free waveforms by a method in accordance with one embodiment of the invention.
Figure 12B:
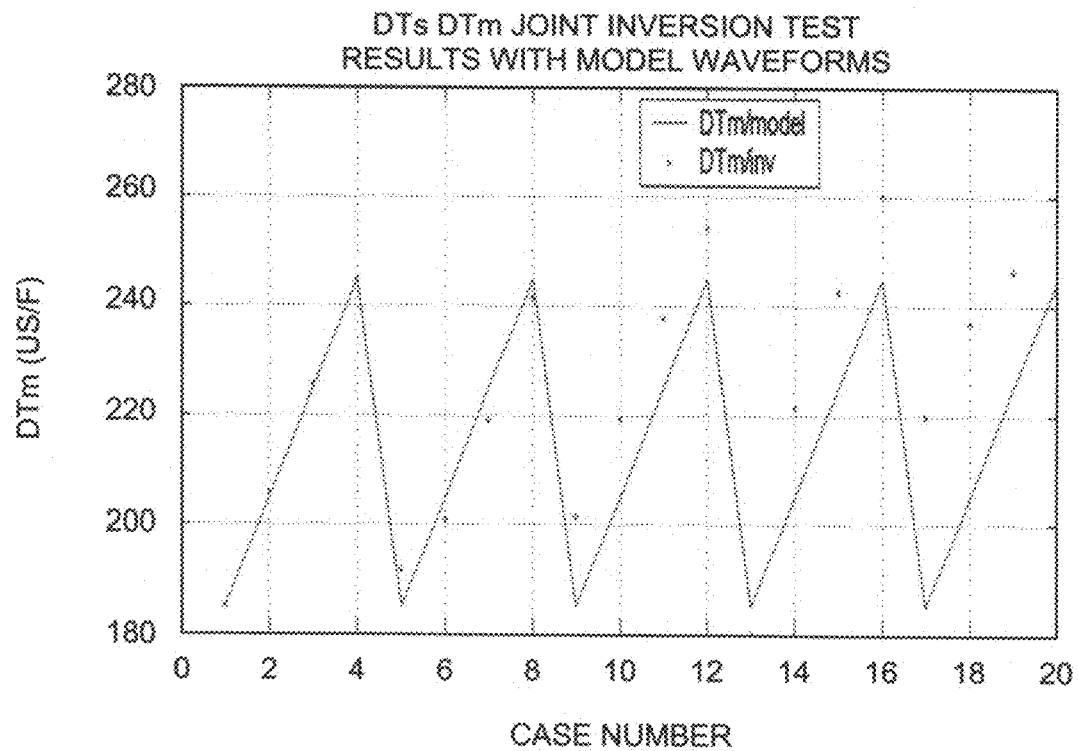
Figure 12C:
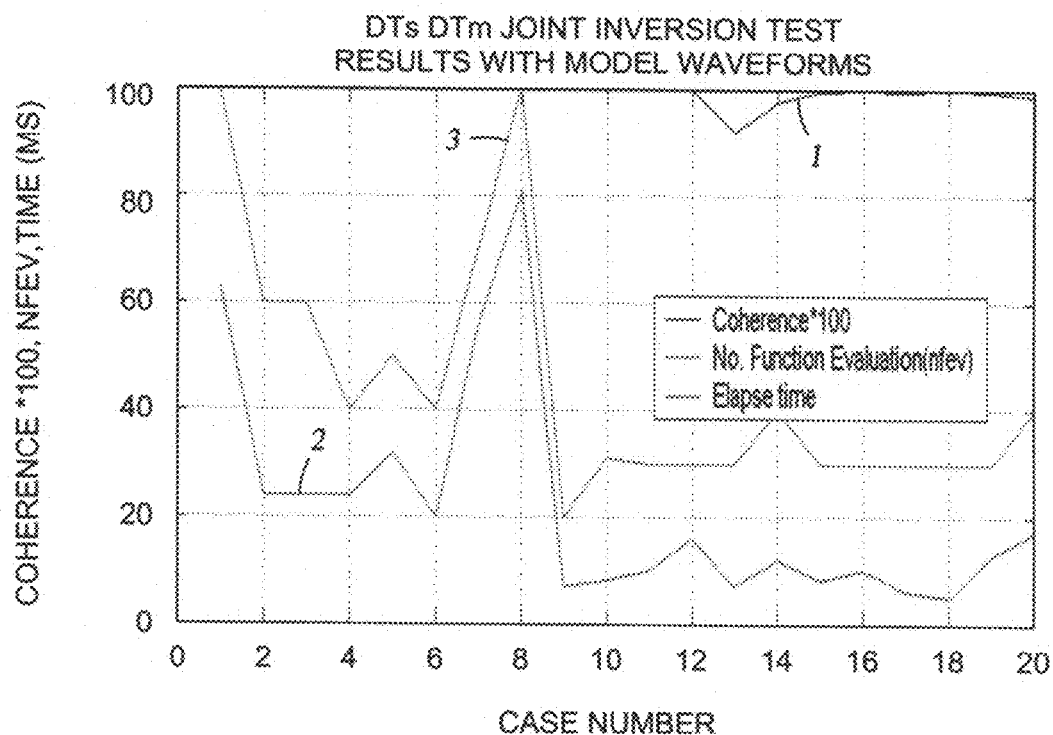
Figure 13A:
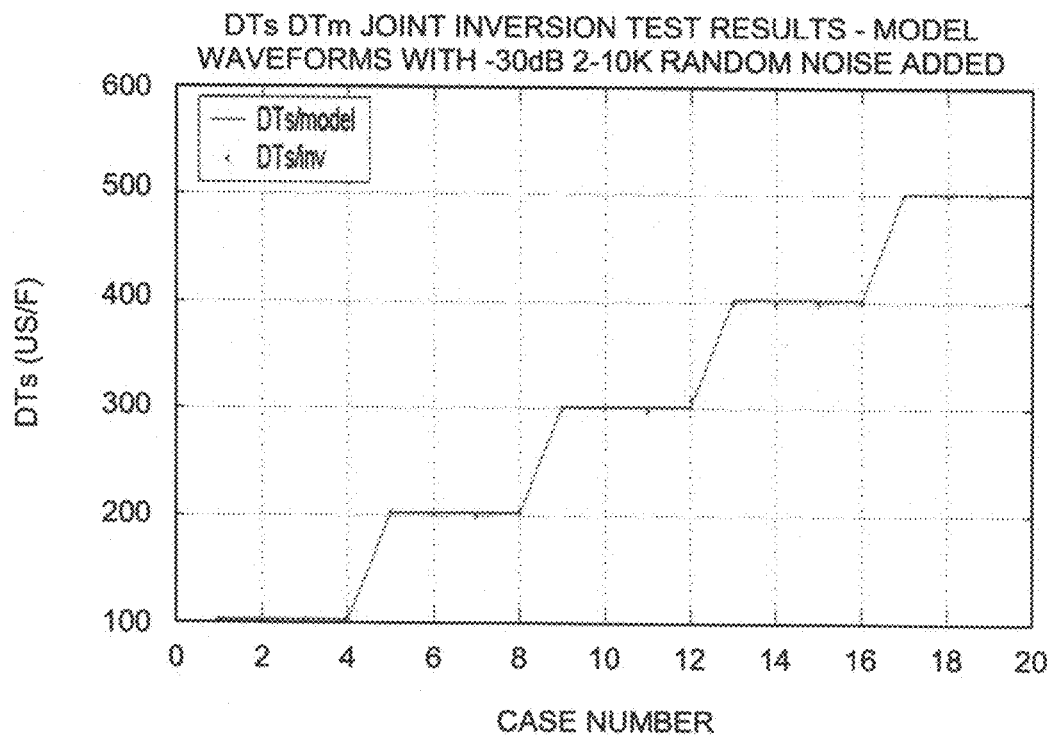
FIG. 13 shows results of various parameters as derived from waveforms including –30 dB noise levels by a method in accordance with one embodiment of the invention.
Figure 13B:
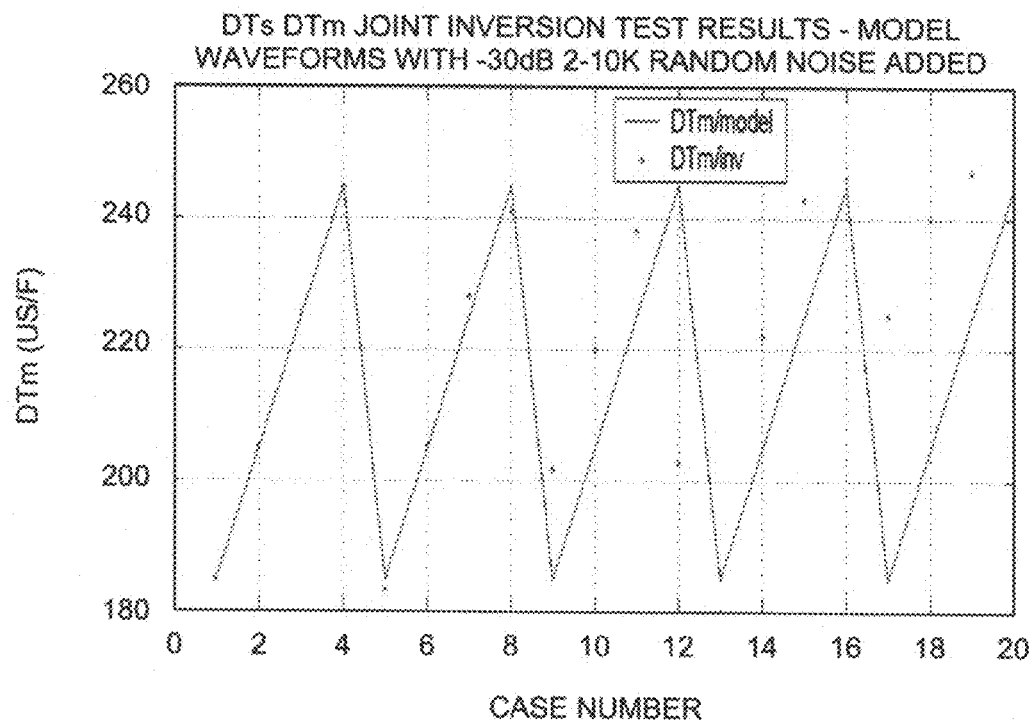
Figure 13C:
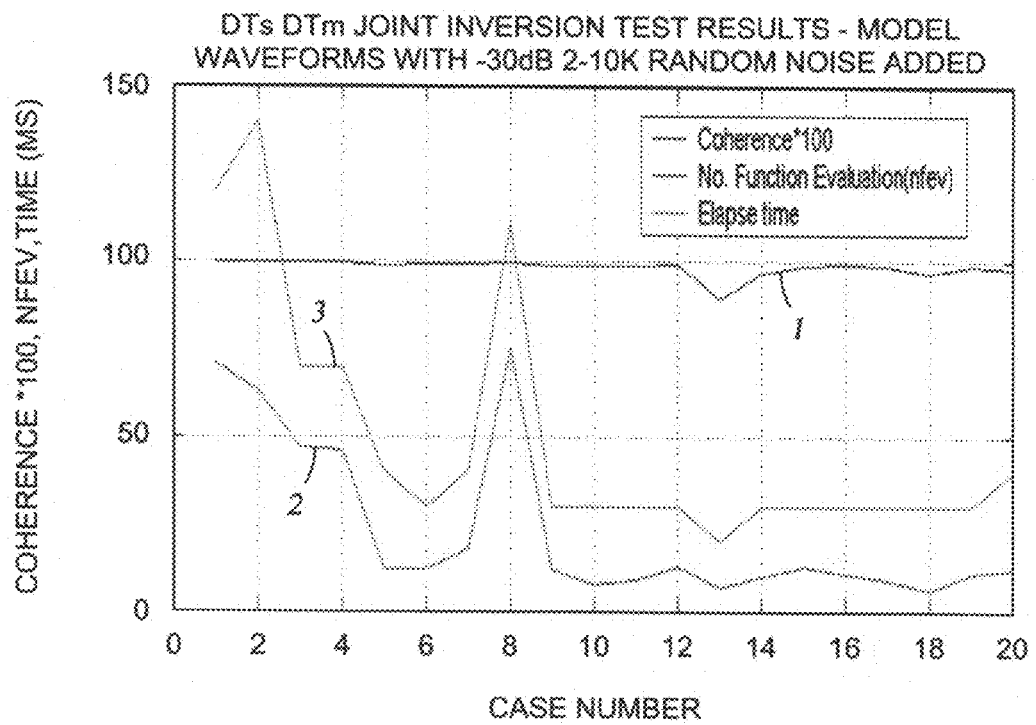
Figure 14A:
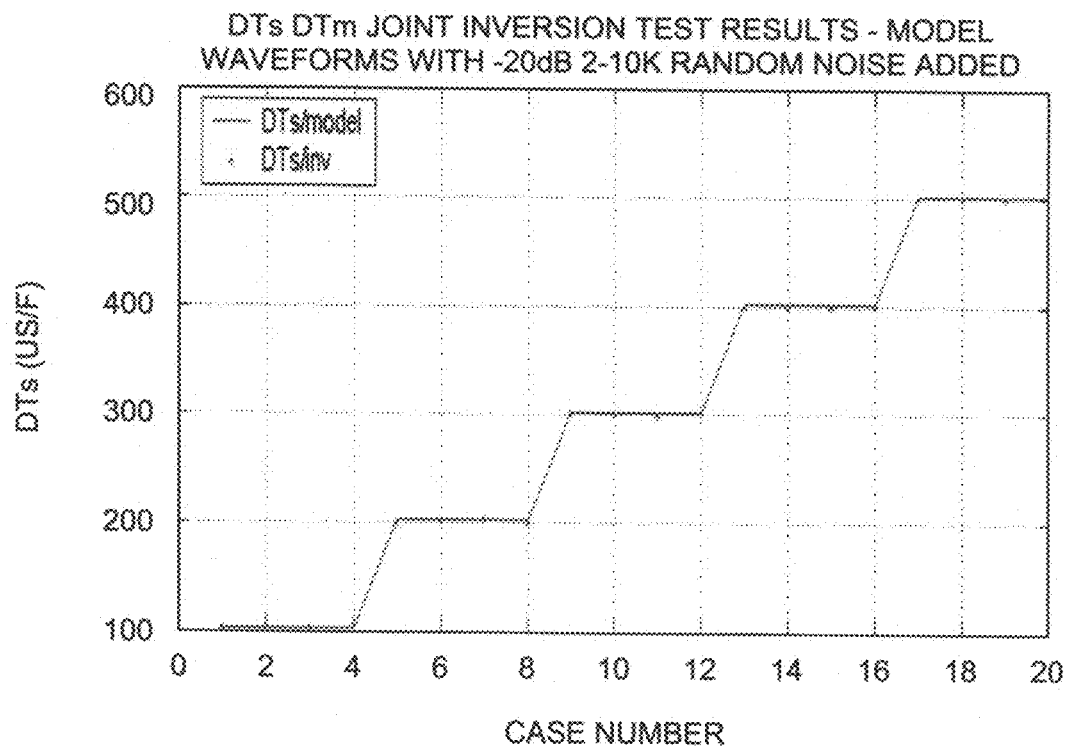
FIG. 14 shows results of various parameters as derived from waveforms including –20 dB noise levels by a method in accordance with one embodiment of the invention.
Figure 14B:
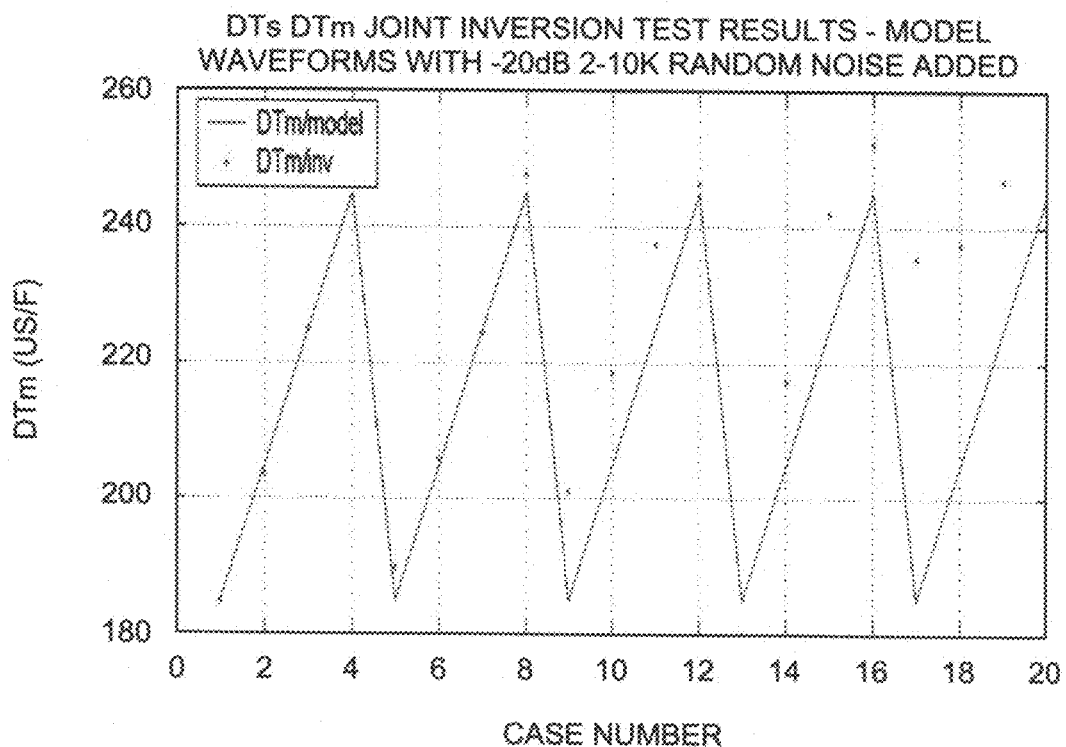
Figure 14C:
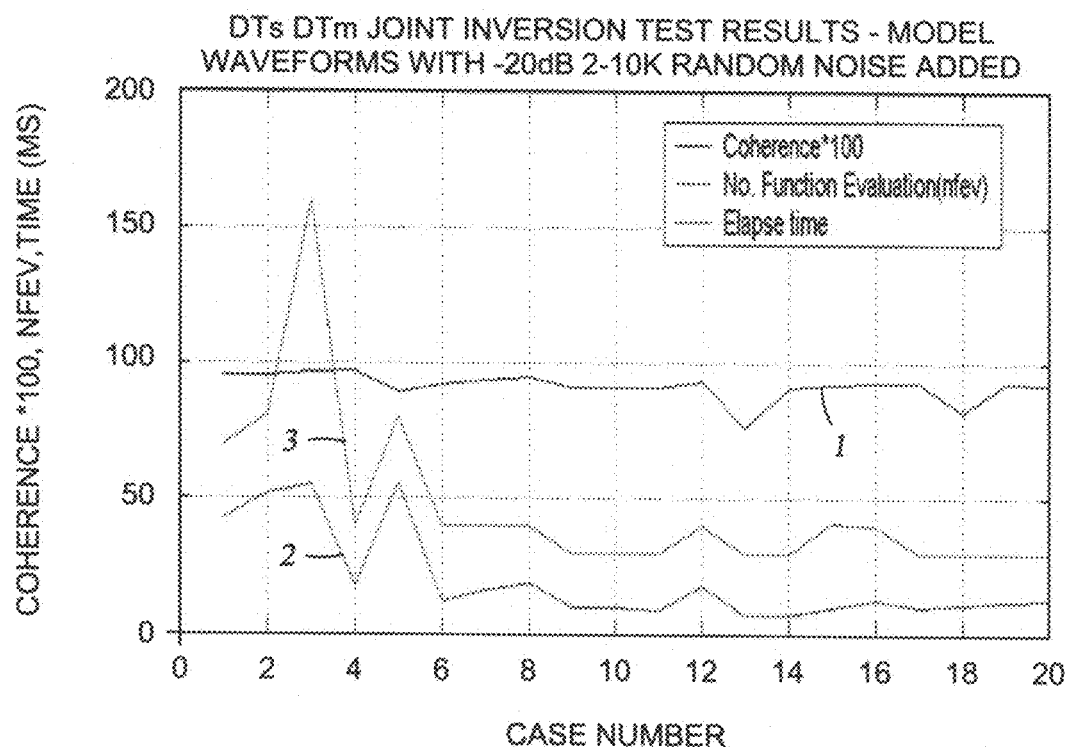
Figure 15A:
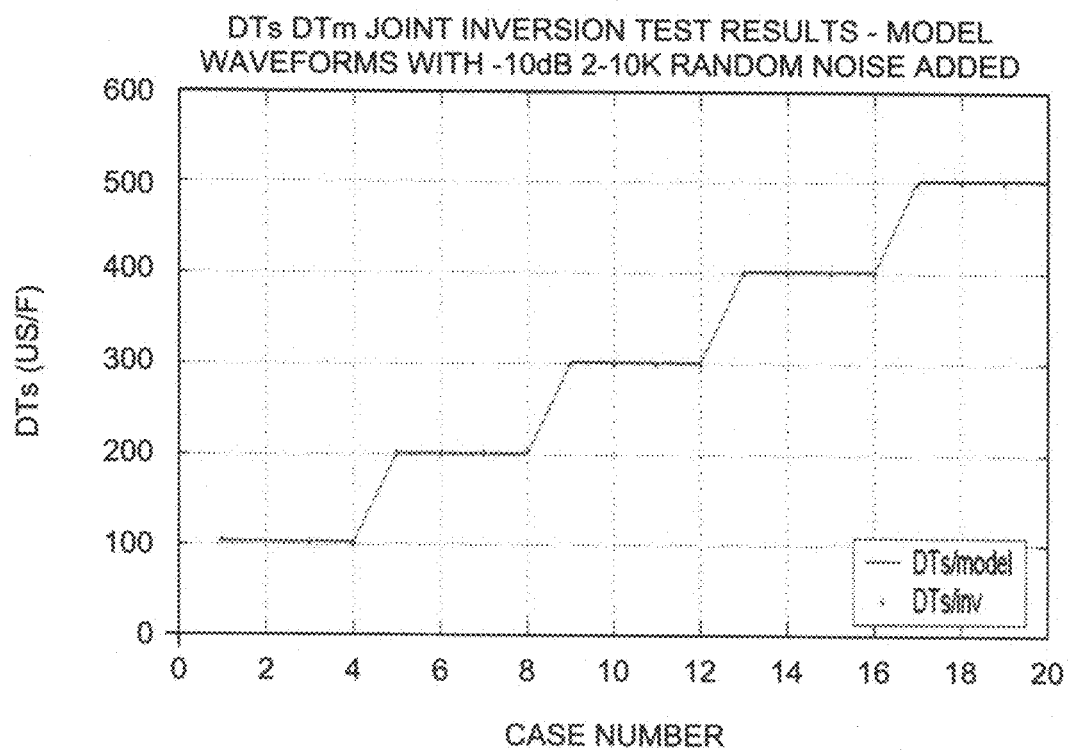
FIG. 15 shows results of various parameters as derived from waveforms including –10 dB noise levels by a method in accordance with one embodiment of the invention.
Figure 15B:
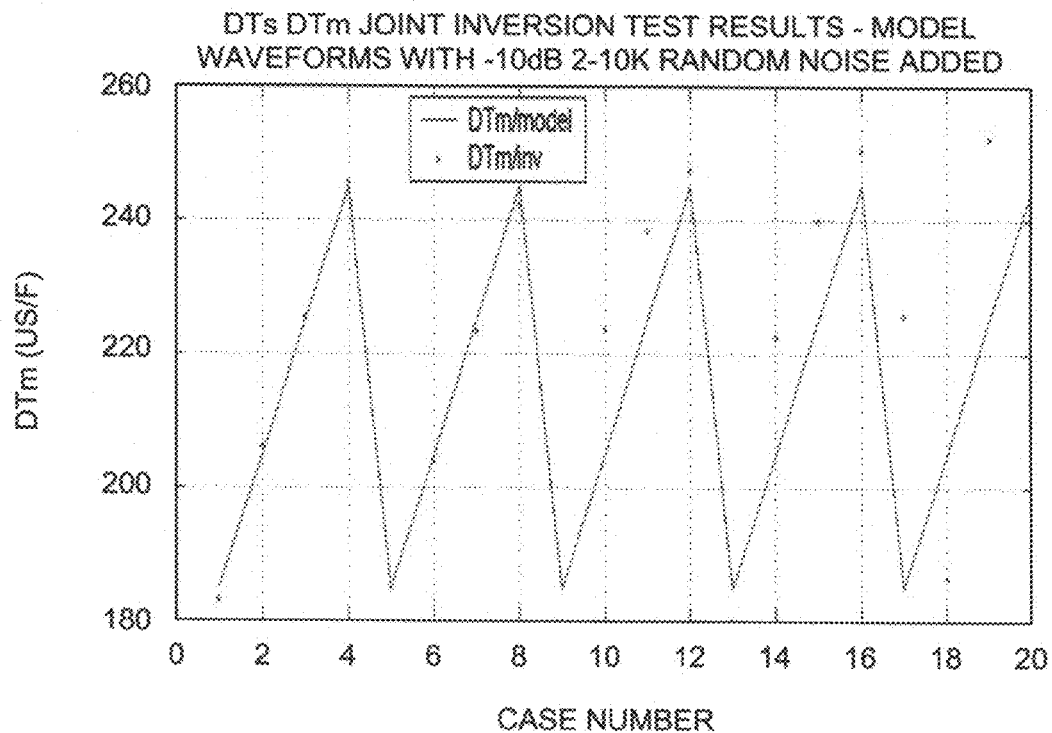
Figure 15C:
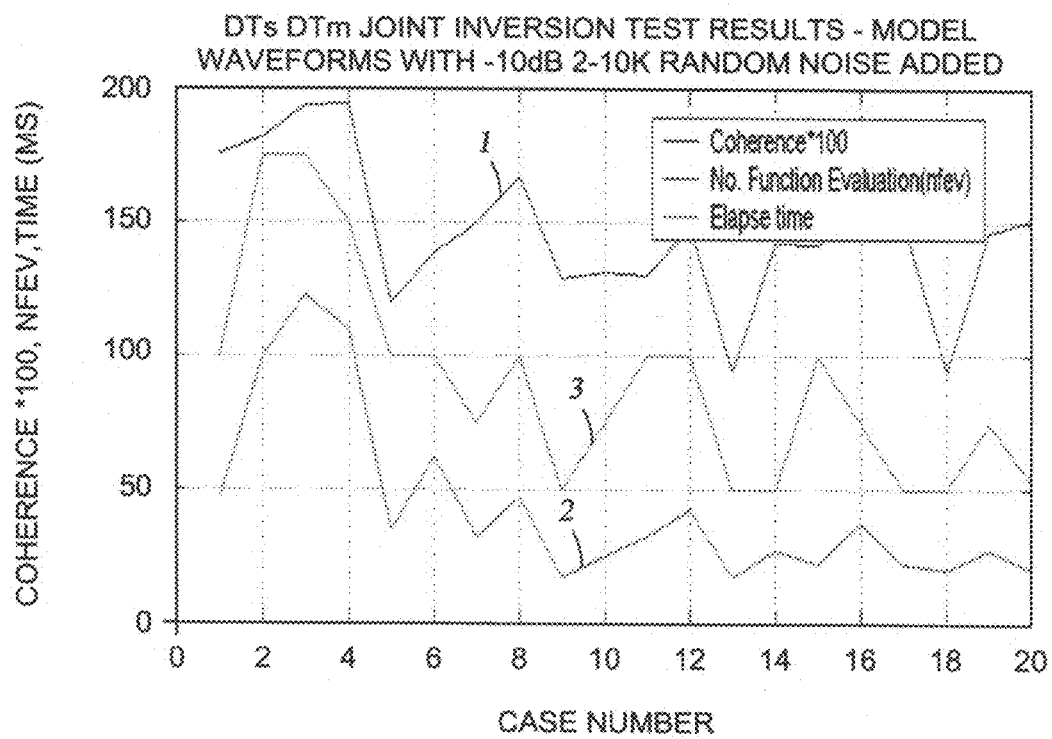

FIGS. 3-7 show the waveforms as they were recorded by the receiver array, i.e., in the time domain. FIGS. 8A-8E show the spectra of these model waveforms in the frequency domain for rocks #1 through #5, respectively, all with mud #1. For faster formations (rocks #1 and #2; FIGS. 8A and 8B), the collar arrivals, the borehole quadrupole mode and the fluid modes were also commingled in the frequency domain. For the slower formations (rocks #3, #4, and #5; FIGS. 8C-8E), the peak spectral energy of the borehole quadrupole mode became separated from that of the collar arrivals and the fluid modes. As shown in FIGS. 8C-8E, the borehole quadrupole mode's spectrum is the low frequency hump (L), and that of the collar arrivals and the fluid modes is the high frequency hump (H).

It is apparent that most of the borehole quadrupole mode showed up in the frequency range from 2 to 10 KHz, while this frequency range included little of the high frequency fluid modes and collar arrivals for the soft formation cases. Thus, if one is interested in inverting the quadrupole modes, it would be sufficient to limit the frequency range from 2 to 10 KHz. Accordingly, some embodiments of the invention include a frequency band limit of 2 to 10 KHz. That is, fmin=2 KHz, and fmax=10 KHz (see 203 in FIG. 2).

The spectra plots (FIGS. 8A-8E) also show that the amplitude of the borehole quadrupole mode decreases rapidly as the formation slowness increases. The peak amplitudes drop by 33.5 dB from rock #1 (FIG. 8A) to rock #5 (FIG. 8E).

The above waveforms (FIGS. 3-8) correspond to signals without any noise. Waveforms obtained in acoustic logging operations would most likely contain noise. Thus, the effect of random noise to the accuracy of the inversion was also studied. Three levels of band limited (2-10 KHz) random noise were evaluated. These frequency band limits for noise match the inversion frequency band limits used in the study. The three levels of noise have amplitudes −30 dB, −20 dB, and −10 dB relative to the peak amplitudes of the respective waveforms. The −30 dB noise level corresponds to waveforms having a good signal-to-noise ratio, while −20 dB and −10 dB noise levels correspond to waveforms having medium and poor signal-to-noise ratios, respectively. In real logging environments, the amplitudes of the noise will not change as a function of the formation signal amplitudes. Therefore, fixing the noise levels at −30, −20, and −10 dB relative to the signal amplitudes likely represents excessively high noise levels for the fast formations (rock #1 & #2), which have high signal amplitudes. The −30 dB, −20 dB, and −10 dB noise added waveforms for rock #1 through #5 (all with mud #1) are shown in FIGS. 9-11, respectively.

The following time window (see 212 in FIG. B) and frequency parameters (see 213 in FIG. 2B) were used to process the entire 20 frames of the model waveforms. However, one of ordinary skill in the art would appreciate that the selection of other parameter values (i.e., different time windows or frequency band limits) may also be used.

T=window starting time=800 µs

TWL=length of the time window=7000 µs

DTsw=move out of the time window=0 µs/f

Fmin=low frequency limit for the inversion=2 KHz

Fmax=high frequency limit for the inversion=10 KHz

The time window used in this analysis was very wide, and, therefore, the windowed waveforms contain essentially all wave components, including the collar arrivals, the fluid modes, and the borehole quadrupole modes.

A two-parameter DTs, DTm joint inversion was performed initially, while the remaining parameters (DTc, ρb, ρm, and HD) were presumed known. The inversion results are shown in FIGS. 12-15 for the cases of noise-free, −30 dB, −20 dB, and −10 dB noise levels, respectively. In each of these figures, the top plot (panel A) shows the inverted and model DTs values, the middle plot (panel B) shows the inverted and model DTm values, and the bottom plot (panel C) shows the coherence (computed at the inverted DTs and DTm values), the number of function evaluation (nfev) for the inversion, and the elapsed computer time for processing each data frame. The coherence value associated with the inversion can be used as a quality indicator in the same manner as it is used in the DSTC processing. See U.S. Pat. No. 5,278,805 issued to Kimball. The number of function (cost function) evaluation (nfev) is an indicator of how fast the algorithm converges to its final answer. The elapsed computing times values shown in these figures are based on computation performed on a Dell Precision 420 PC with an 850 MHz CPU.

For all these cases, the inverted DTs values match the model DTs values almost exactly with negligible errors (Panels A of FIGS. 12-15). This result indicates that the inversion techniques of the invention can tolerate other wave components in this wide fixed window (2-10 KHz) as well as noise up to at least −10 dB level. Therefore, fine-tuning of the window position and frequency range may not be necessary at this noise level (up to −10 dB relative to the waveform signals).

In contrast to the DTs values (Panels A in FIGS. 12-15), the inverted DTm values (Panels B in FIGS. 12-15) match well with the model DTm values only in the faster formations (rocks #1 and #2). The match becomes progressively worse as the formations become slower. This result is consistent with the prediction of the sensitivity analysis, which shows that as the formations become slower, the dispersion curves of the borehole quadrupole mode become much less sensitive to the DTm. It is known that any small amount of error introduced by the forward engine or the inversion algorithm will be translated into a rather large error in the inverted parameters with poor sensitivity. This is taken into consideration when interpreting the output of the inverted DTm.

As expected, the inverted coherence values (curves 1 in panels C of FIGS. 12-15) show a general decrease as the noise levels increase. Therefore, the inverted coherence from a method of the invention can be used as a quality indicator in the same way as in the STC or DSTC processing.

The number of function evaluation (nfev) (curves 2 in panels C of FIGS. 12-15) shows a generally decreasing trend as the formation becomes slower. The complexity of the shape of the cost function in the parameter space will determine how fast the algorithm converges to its final answer. The more complex the shape, the more iterations (and therefore more nfev) are needed. As will be shown later, cost functions for the faster formations have more complex shape than those for the slower formations. This qualitatively explains the decreasing trend of nfev as the formation becomes slower. In these examples, it takes 20-80 nfev in faster formations (rock #1 & #2) and only 10-20 nfev in slower formations (rock #3, #4, & #5) for the algorithm to converge. These nfev numbers, in accordance with methods of the invention, are comparable or even smaller than those used in regular DSTC algorithm, which scans the entire DTs range with a fixed increment.

The computational times (curves 3 in panels C of FIGS. 12-15) for the inversion are generally proportional to the nfev values and may include some constant overheads. As note above, these computations were performed on a Dell Precision 420 PC with an 850 MHz CPU. On average, it takes about 46.72 ms to invert one frame of the waveform data. In other words, the processing speed is slightly faster than 20 frames/second using an inversion method of the invention. This computational load is not too demanding. Thus, the invention is suitable for implementation in downhole applications.

FIGS. 16A-16E show contour plots of noise-free back-propagated coherence as functions of the DTs and DTm for the 5 different formations, rock #1-#5, respectively, with mud slowness of 225 µs/f (mud #3). As will be described in the following sections, these contour plots reveal important characteristics of the cost function and explain the inversion results.

Figure 16A:
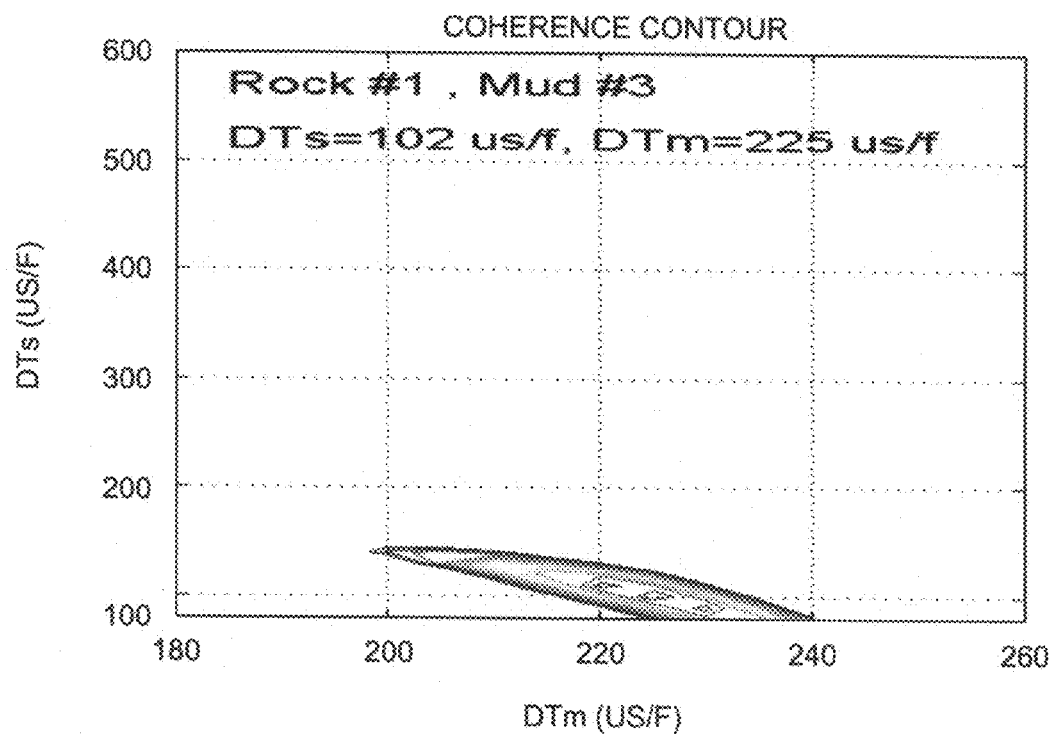
FIG. 16 shows coherence contour plots of various formations in DTs and DTm parameter space as determined by a method in accordance with one embodiment of the invention.
Figure 16B:
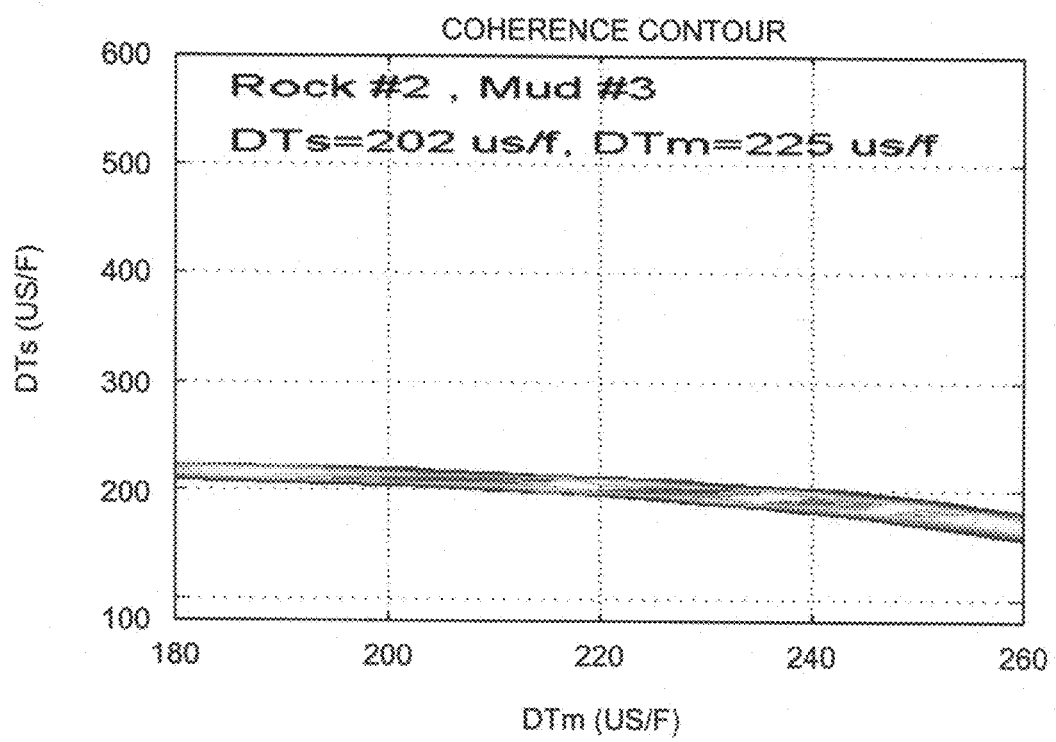
Figure 16C:
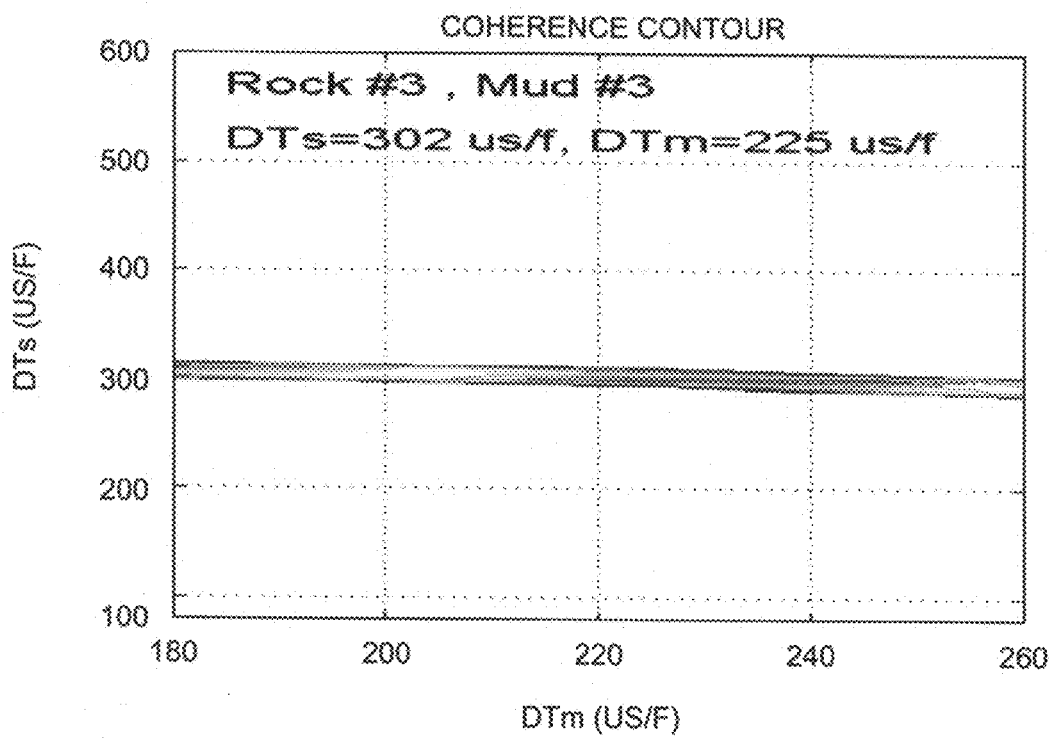
Figure 16D:
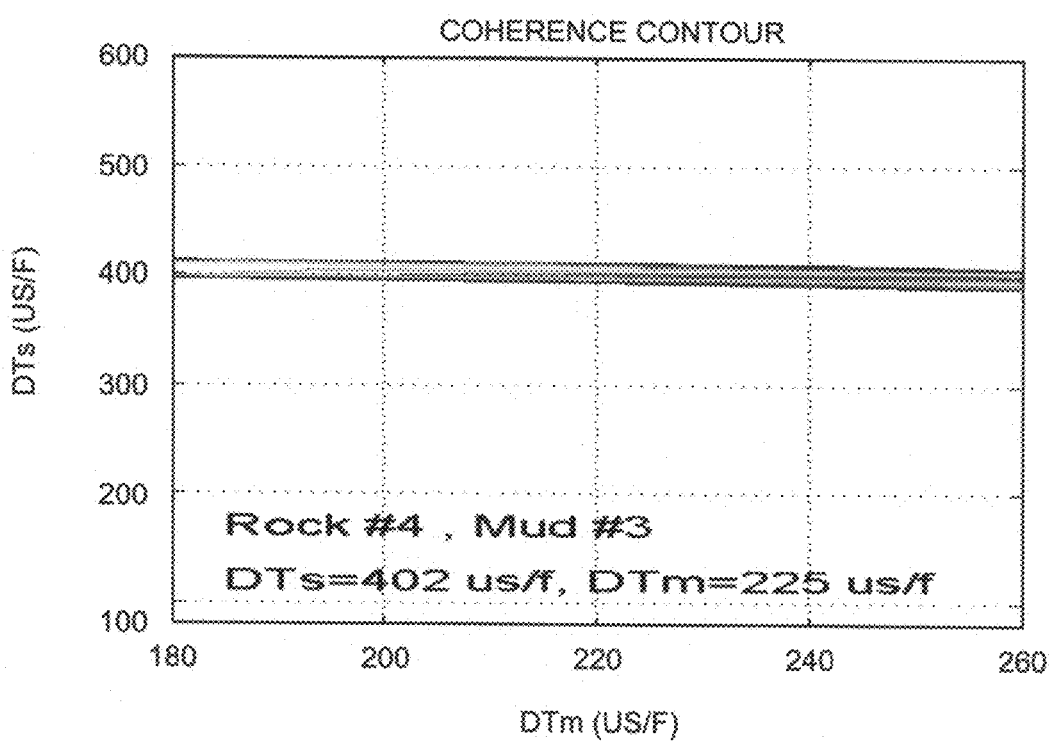
Figure 16E:
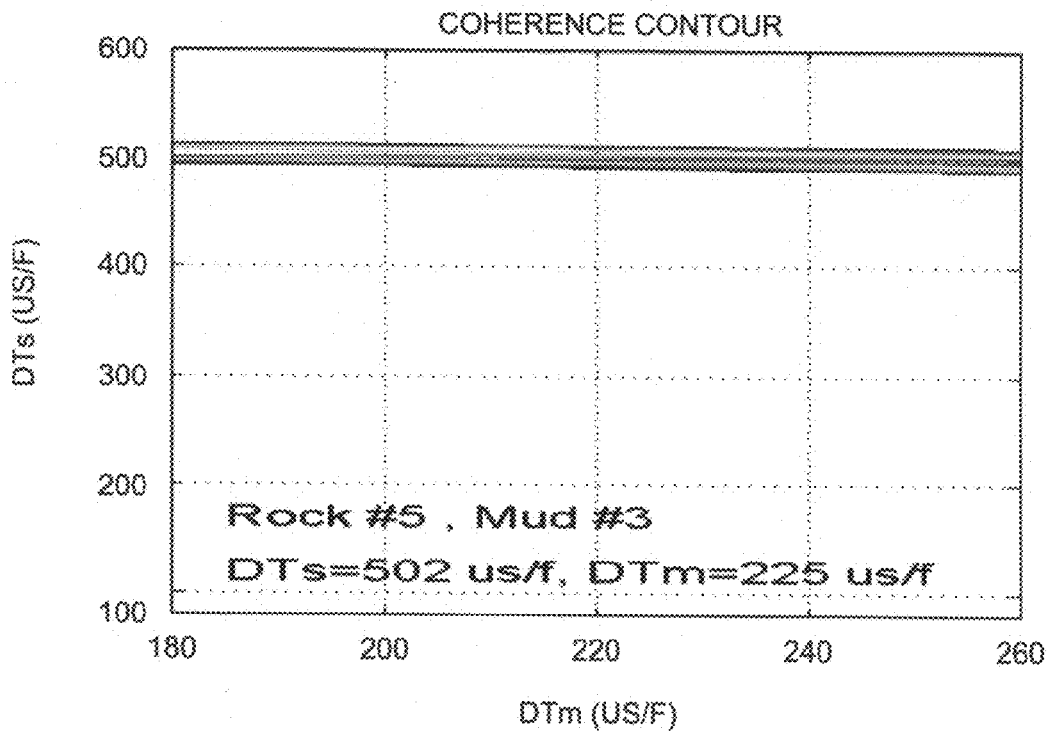

In fast formations such as rock #1 (FIG. 16A), the contours of the peak coherence have a simple ellipsoidal shape slanted significantly upward toward the vertical axis. Note that the vertical (DTs) and horizontal (DTm) axes are plotted on different scales in these figures. As shown in FIG. 16A, when DTm changes from 200 µs/f to 230 µs/f, the ridgeline (peak of the coherence) of the contour shows that DTs varies from 140 µs/f to about 80 µs/f, which is about twice as much as the DTm variation. Thus, if the two axes are plotted on the same scale, the ellipsoidal contour would be slanted at a 60-degree angle from the horizontal line. This shows that in fast formations, the coherence is more sensitive to DTm than to DTs. Therefore, it is important to perform the inversion with respect to both DTs and DTm in order to get a correct DTs answer. As the formations become slower, the coherence contour ellipsoids become elongated and the slant angles also decrease. For the very slow formations (such as rock #5; FIG. 16E), the contour ellipsoids become almost horizontal, indicating that the coherence is not sensitive to DTm variations.

These series of contour plots predict that the inversion for both DTs and DTm will be accurate only in fast formations where the contour ellipsoids show significant slant. For the slower formations, where the contour ellipsoids are almost horizontal in these plots, only the inverted DTs will be accurate, and any reasonable DTm value will lead to about the same DTs value.

The simple one-hump contour in the DTs-DTm parameter space also explains the relatively fast and robust convergence of the inversion. This is an important finding because it is not obvious that the windowed waveforms, which contain many wave components, will yield such a simple single-peaked coherence contour plot. If the shape of the coherence in the parameter space has a multi-peak structure, the inversion may not be able to converge to the right peak robustly.

In fast formations (e.g., FIG. 16A), the steeper slant angles of the coherence contour ellipsoids suggest that the inversion algorithm should not take big steps in the iterations toward the peak. In slow formations (e.g., FIG. 16E), the algorithm may take fewer and larger steps in the iterations toward the coherence peak because of the simpler contour shapes. This explains the general trend, as shown in panels C of FIGS. 12-15, that faster formations need more iterations (larger nfev) to converge.

While the above examples use quadrupole modes to illustrate applications of embodiments of the invention, methods of the invention are not limited to quadrupole modes. The techniques of the invention may also be used to invert waveforms obtained with monopole, dipole, and higher-order tools. Being able to invert waveforms from various sources makes it possible for a method of the invention to provide an indicator of formation anisotropy.

Figure 17:
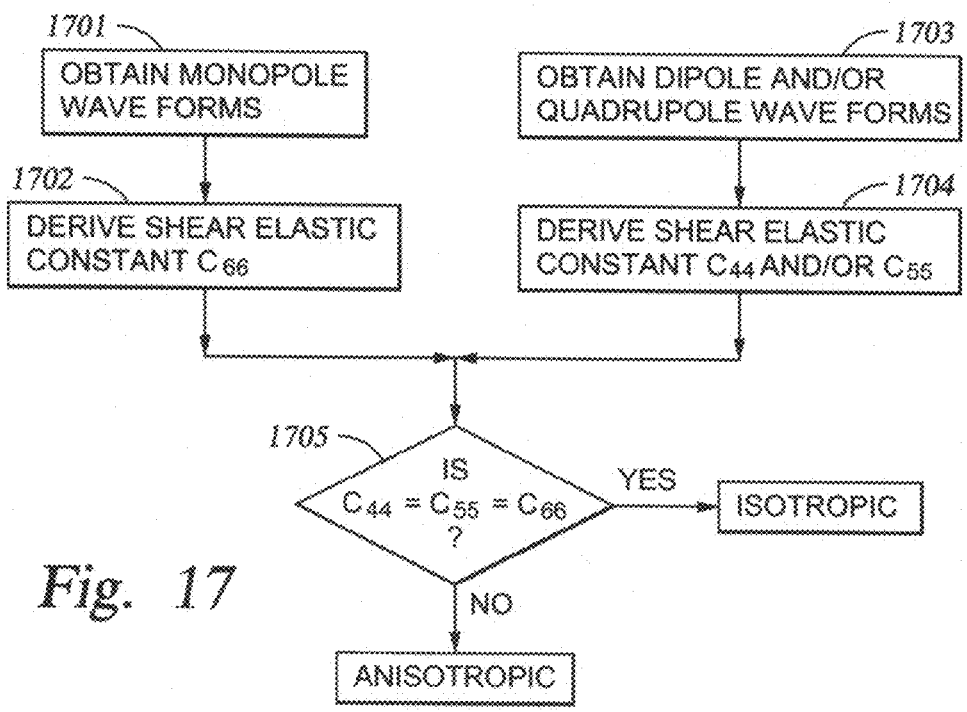
FIG. 17 is a flow chart of a method for determining formation anisotropy in accordance with one embodiment of the invention.

As shown in FIG. 17, a method in accordance with one embodiment of the invention may provide an anisotropy indicator to flag a condition of $C_{44}$ and/or $C_{55} \neq C_{66}$. The method may comprise obtaining monopole waveforms (e.g., Stoneley mode) (step 1701) and deriving the shear elastic constant ($C_{66}$) for the monopole Stoneley mode (step 1702). The method also obtains waveforms for the dipole flexural mode and/or the quadrupole mode (step 1703). These waveforms may be acquired with a dipole or multipole tool, for example. The shear elastic constants ($C_{44}$ and/or $C_{55}$) for the dipole or quadrupole modes are calculated (step 1704). Then, the monopole, dipole, and quadrupole shear elastic constants are compared (step 1705) to see if $C_{44} = C_{55} = C_{66}$, which indicates an isotropic formation. Otherwise, an anisotropic formation is indicated. One of ordinary skill in the art would appreciate that for anisotropic formations, deriving two shear elastic constants may be sufficient (as long as one inequality is established between $C_{44}$ and $C_{66}$, or between $C_{55}$ and $C_{66}$), and it is unnecessary to have all three shear elastic constants.

Some embodiments of the invention related to systems to implement the disclosed techniques. A system in accordance with embodiments of the invention includes a processor, which may be a uphole processor (e.g., 27 in FIG. 1), a downhole processor (e.g., 30a in FIG. 1), or a general computer (such as a personal computer or a work station). The system also includes at least one memory for storing programs to perform a method of the invention. The memory may be part of the processor or a separate unit.

Some embodiments of the invention relate to a recording medium that stores a programs having instructions for performing a method in accordance with embodiments of the invention. The recording medium is computer (or CPU, central processor unit) readable. The recording medium may comprise any medium known in the art or yet to be discovered, including a magnetically readable medium (e.g., a hard disk, a floppy diskette, a tape, etc.), an optically readable medium (e.g., a compact disc (CD), a digital versatile disc (DVD), etc.), and the like. The program stored on such a medium may be in any programming language and in any format, compiled or uncompiled.

The results described above clearly demonstrate potential advantages of inversion methods of the invention over the conventional DSTC method because no prior knowledge or presumption about the borehole-formation parameters is needed. Significantly, the conventional DSTC method inverts only one parameter (i.e., formation shear slowness) from the acoustic waveforms, while methods of the invention are capable of inverting other borehole-formation parameters in addition to the formation shear slowness.

In addition, advantages of the invention may include one or more of the following. Embodiments of the invention may be used in various applications using existing tools—monopole, dipole, quadrupole, and higher-order tools. Implementing a method of the invention to extract the shear slowness will greatly enhance the capability of the conventional acoustic tools. First, methods of the invention may be used to obtain shear slowness estimates from monopole Stoneley mode in formations ranging from fast formations to slow formations. Secondly, methods of the invention may be used to obtain dipole shear slowness estimates that are independent of the mud slowness. It is well known that the DSTC algorithm currently used in existing tools for processing dipole waveforms requires an accurate DTm estimate in order to obtain an accurate DTs log. On the other hand, accurate estimates of the DTm values may not always be available. In contrast, methods of the invention do not depend on an accurate estimate of the DTm value.

Furthermore, methods of the invention may be used to provide indication of formation isotropy (i.e., $C_{44} = C_{55} = C_{66}$) or anisotropy (i.e., $C_{44}$ and/or $C_{55} \neq C_{66}$). The method may be based on a comparison between the shear elastic constant ($C_{66}$) derived from monopole Stoneley mode and that ($C_{44}$ or $C_{55}$) derived from dipole flexural mode as detected by a dipole or multipole tool.

While the invention has been described with respect to a limited number of embodiments, those skilled in the art, having benefit of this disclosure, will appreciate that other embodiments can be devised which do not depart from the scope of the invention as disclosed herein.

What is claimed is:

1. A method for processing sonic waveforms acquired in a borehole traversing a subterranean formation, comprising:
    (a) generating a plurality of model dispersion curves from mud slowness parameter and formation slowness parameter;
    (b) generating a measured dispersion curve from the acquired waveforms;
    (c) determining a difference between the model dispersion curves and the measured dispersion curve to compute a cost function;
    (d) determining, with a processor, a formation velocity from a model dispersion curve that produces the minimal cost function or reduces the cost function to below a selected value, wherein the determining comprises iteratively adjusting values of the mid slowness parameter and formation slowness parameter to produce the minimal cost function or reduce the cost function between the model dispersion curves and the measured dispersion curve to below the selected value; and
    (e) outputting, with the processor, at least a portion of a set of borehole-formation parameters wherein the subterranean formation comprises a fast formation and the formation velocity is determined without prior knowledge of a mud velocity.

2. The method of claim 1, wherein the model dispersion curves are generated from at least two of formation shear slowness, formation compressional slowness, mud slowness, formation density, mud density, borehole diameter, signal time support window, and signal frequency range.

3. The method of claim 1, wherein the cost function is an indicator of fit.

4. The method of claim 1, wherein generating the plurality of model dispersion curves comprises retrieving from a pre-computed dispersion curve database.

5. The method of claim 1, wherein generating the plurality of model dispersion curves comprises accounting for acoustic effect of a tool string.

6. The method of claim 1, wherein The computing a cost function comprises using a non-linear least square fit algorithm.

7. The method of claim 6, wherein The non-linear least square fit algorithm is a Levenberg-Marquardt algorithm or a Gaussian-Newton algorithm.

8. The method of claim 1, wherein the sonic waveforms comprise signals from a Stoneley mode, a dipole mode, or a quadrupole mode.

9. The method of claim 1, wherein the computing a cost function comprises computing a lower cost function corresponding to a fit between the model dispersion curves and the measured dispersion curve from the acquired sonic waveforms.

10. The method of claim 1, wherein the sonic waveforms axe acquired from one selected from the group consisting of a logging-while-tripping tool, a logging-while-drilling tool, and a measurement-while-drilling tool.

11. A system for processing sonic waveforms acquired in a borehole traversing a subterranean formation, comprising:
  (a) means for generating a plurality of model dispersion curves from mud slowness parameter and formation slowness parameter;
  (b) means for generating a measured dispersion curve from the acquired waveforms;
  (c) means for determining a difference between the model dispersion curves and the measured dispersion curve to compute a cost function;
  (d) means for determining a formation velocity from a model dispersion curve that produces the minimal cost function or reduces the cost function to below a selected value, wherein the determining comprises iteratively adjusting values of the mud slowness parameter and formation slowness parameter to produce the minimal cost function or reduce the cost function between the model dispersion curves and the measured dispersion curve to below the selected value; and
  (e) means for outputting at least a portion of a set of borehole-formation parameters,
  wherein the subterranean formation comprises a fast formation and the formation velocity is determined without prior knowledge of a mud velocity.

12. The system of claim 11, wherein the model dispersion curves are generated from at least two of formation shear slowness, formation compressional slowness, mud slowness, formation density, mud density, borehole diameter, signal time support window, and signal frequency range.

13. The system of claim 11, wherein generating the plurality of model dispersion curves comprises retrieving from a pre-computed dispersion curve database.

14. The system of claim 11, wherein the computing a cost function comprises using a non-linear least square fit algorithm.

15. The system of claim 14, wherein the non-linear least square fit algorithm is a Levenberg-Marquardt algorithm or a Gaussian-Newton algorithm.

16. The system of claim 11, wherein generating the plurality of model dispersion curves comprises accounting for acoustic effect of a tool string.

17. The system of claim 11, wherein the sonic waveforms comprise signals from a Stoneley mode, a dipole mode, or a quadrupole mode.

18. The system of claim 11, wherein the computing a cost function comprises computing a lower cost function corresponding to a fit between the model dispersion curves and the measured dispersion curve from the acquired sonic waveforms.

* * * * *